(12) United States Patent
Shirai et al.

(10) Patent No.: US 11,697,467 B2
(45) Date of Patent: Jul. 11, 2023

(54) RIDER-POSTURE CHANGING DEVICE

(71) Applicant: Shimano Inc., Osaka (JP)

(72) Inventors: Toyoto Shirai, Osaka (JP); Nicholas C Murdick, Irvine, CA (US)

(73) Assignee: Shimano Inc., Osaka (JP)

( * ) Notice: Subject to any disclaimer, the term of this patent is extended or adjusted under 35 U.S.C. 154(b) by 274 days.

(21) Appl. No.: 17/062,000

(22) Filed: Oct. 2, 2020

(65) Prior Publication Data

US 2022/0106005 A1  Apr. 7, 2022

(51) Int. Cl.
| | |
|---|---|
| *B62J 45/20* | (2020.01) |
| *B62J 1/08* | (2006.01) |
| *B62K 21/16* | (2006.01) |
| *B62J 43/30* | (2020.01) |
| *B62K 25/00* | (2006.01) |

(52) U.S. Cl.
CPC ............... *B62J 45/20* (2020.02); *B62J 1/08* (2013.01); *B62J 43/30* (2020.02); *B62K 21/16* (2013.01); *B62K 25/00* (2013.01); *B62J 2001/085* (2013.01)

(58) Field of Classification Search
CPC ........ B62J 1/08; B62J 2001/085; B62J 45/20; B62J 43/30; B62K 21/16; B62K 25/00
See application file for complete search history.

(56) References Cited

U.S. PATENT DOCUMENTS

| | | | |
|---|---|---|---|
| 8,489,277 B2 | 7/2013 | Hara et al. | |
| 8,909,424 B2 | 12/2014 | Jordan et al. | |
| 10,358,180 B2 | 7/2019 | Shipman et al. | |
| 10,363,986 B2 | 7/2019 | Shirai et al. | |
| 10,843,757 B2* | 11/2020 | Komatsu | B62K 25/10 |
| 2002/0046891 A1* | 4/2002 | Honda | H02K 29/08 180/220 |
| 2009/0255768 A1 | 10/2009 | Inoue | |
| 2015/0239517 A1 | 8/2015 | Shirai | |
| 2017/0282986 A1* | 10/2017 | Jhou | B62J 1/08 |
| 2018/0043968 A1* | 2/2018 | Sala | B62M 9/122 |
| 2018/0079462 A1* | 3/2018 | Shirai | B62K 25/08 |
| 2019/0054968 A1 | 2/2019 | Kurokawa | |
| 2019/0283826 A1 | 9/2019 | Hara et al. | |
| 2019/0283827 A1 | 9/2019 | Shipman et al. | |
| 2019/0351966 A1 | 11/2019 | Shirai et al. | |
| 2020/0269941 A1 | 8/2020 | Hara | |
| 2021/0031850 A1* | 2/2021 | Coaplen | B62K 19/36 |
| 2021/0107581 A1* | 4/2021 | Hara | B62J 45/4152 |

* cited by examiner

*Primary Examiner* — Tony H Winner
(74) *Attorney, Agent, or Firm* — Global IP Counselors, LLP

(57) ABSTRACT

A rider-posture changing device is for a human-powered vehicle. The rider-posture changing device includes a first member, a second member, a positioning structure and an electric actuator. The second member is configured to be movable relative to the first member. The positioning structure is configured to adjustably position the first member relative to the second member. The electric actuator is configured to actuate the positioning structure. The electric actuator includes a first electrical connector and a second electrical connector. The first electrical connector is configured to be detachably and reattachably connected to a first power supply. The second electrical connector is configured to be detachably and reattachably connected to a second power supply.

19 Claims, 20 Drawing Sheets

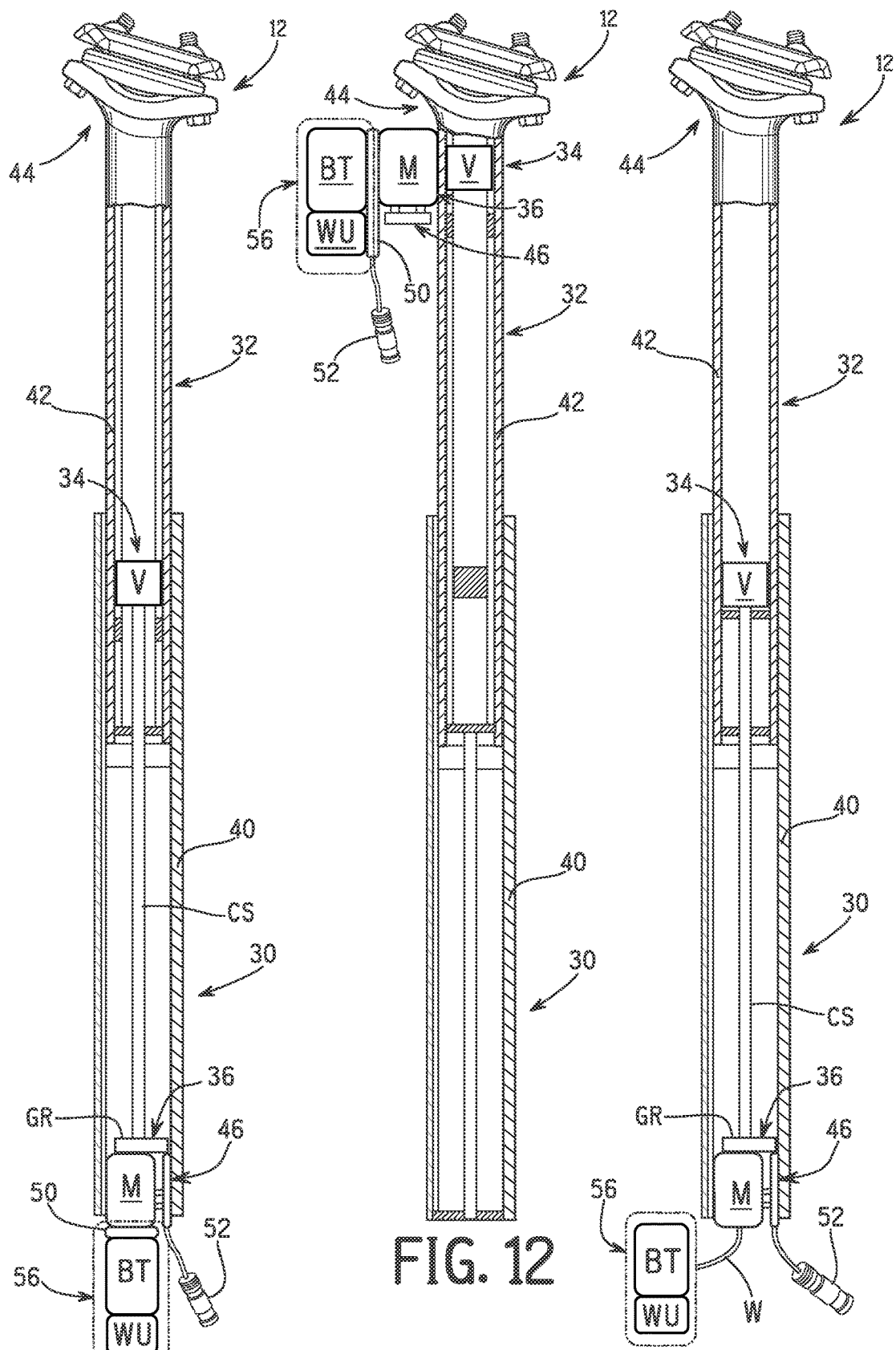

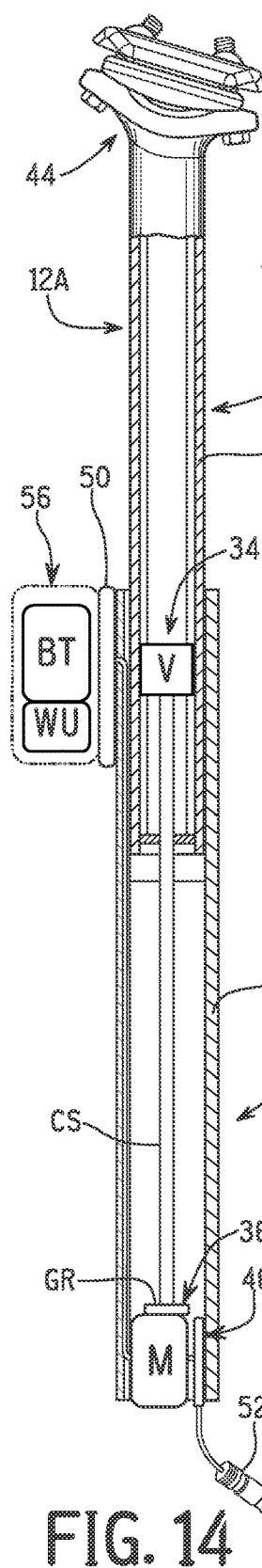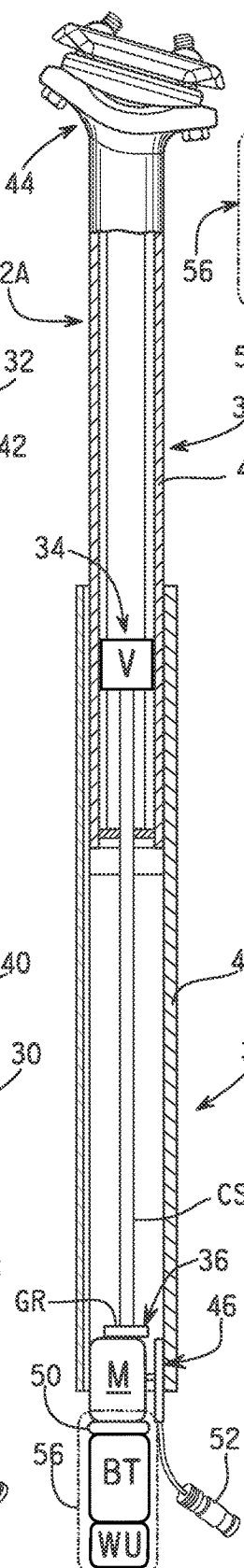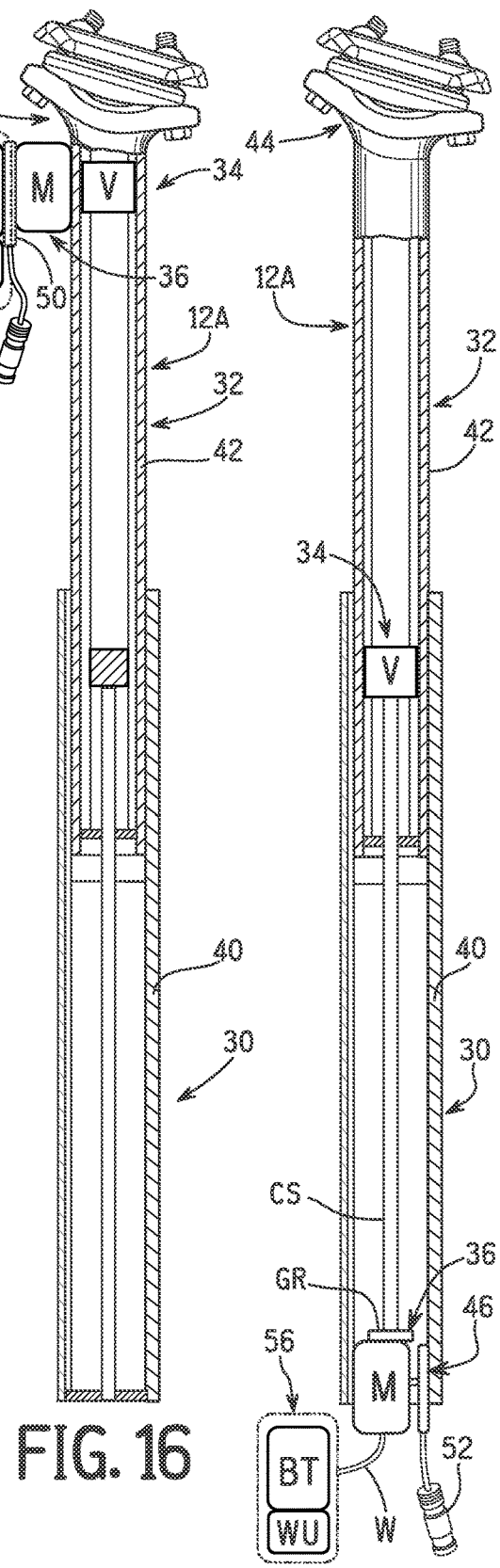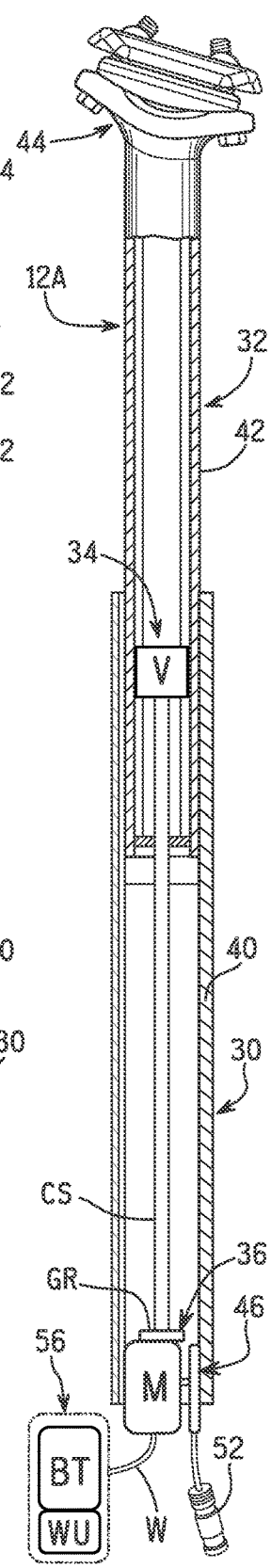

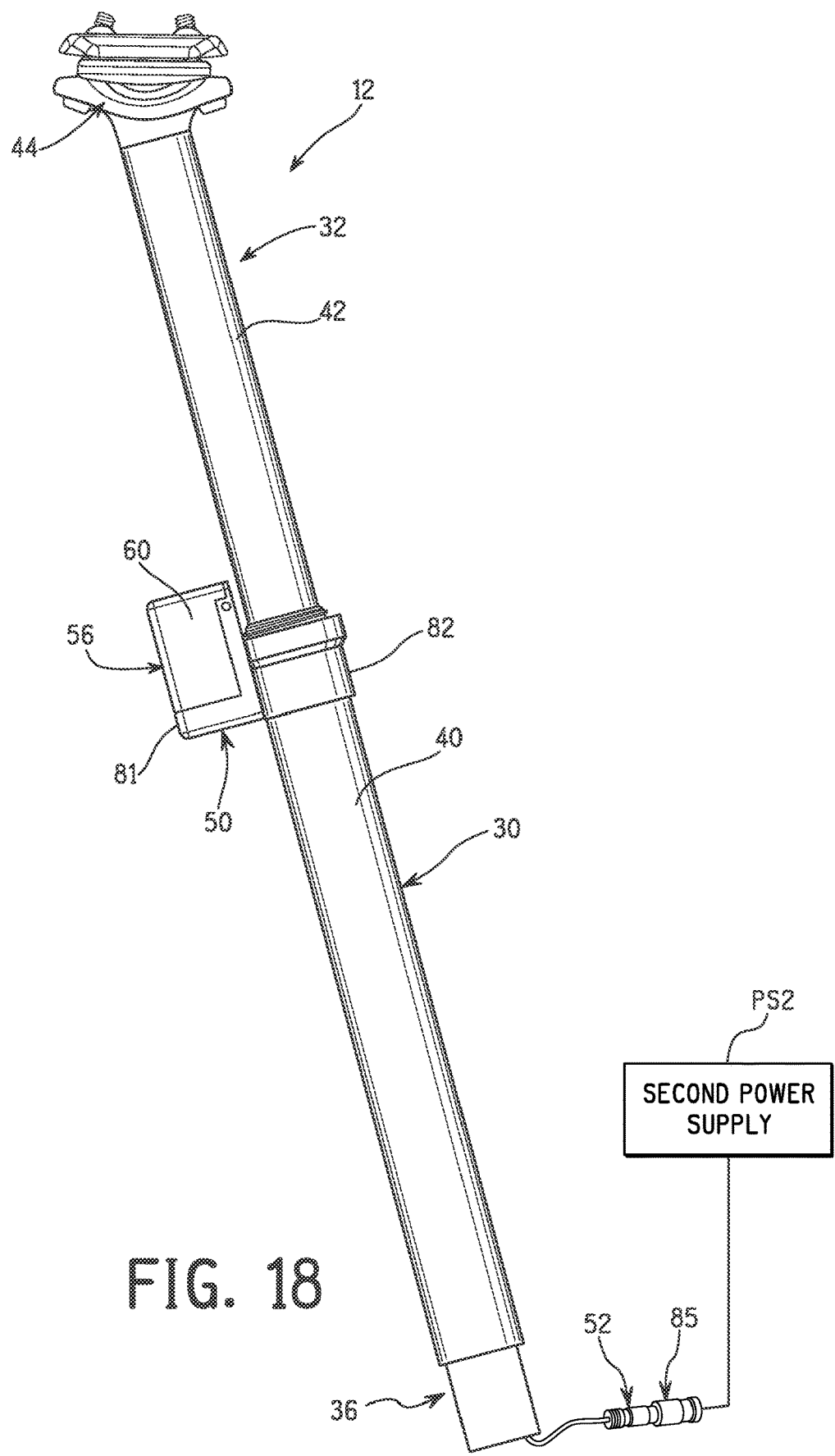

RIDER-POSTURE CHANGING DEVICE

BACKGROUND

Technical Field

This disclosure generally relates to a rider-posture changing device. More specifically, the present disclosure relates to a rider-posture changing device.

Background Information

When riding a human-powered vehicle such as a bicycle, a rider may adopt different riding postures according to various operating conditions. When the rider adopts a different riding posture, it may be desirable to adjust various components of the human-powered vehicle to accommodate the change in the rider's riding posture.

SUMMARY

Generally, the present disclosure is directed to various features of a rider-posture changing device for a human-powered vehicle in which a component of the human-powered vehicle is adjusted that affects a rider's posture while riding the human-powered vehicle.

The term "human-powered vehicle" as used herein refers to a vehicle that can be driven by at least human driving force, but does not include a vehicle using only a driving power other than human power. In particular, a vehicle solely using an internal combustion engine as a driving power is not included in the human-powered vehicle. The human-powered vehicle is generally assumed to be a compact, light vehicle that sometimes does not require a license for driving on a public road. The number of wheels on the human-powered vehicle is not limited. The human-powered vehicle includes, for example, a monocycle and a vehicle having three or more wheels. The human-powered vehicle includes, for example, various types of bicycles such as a mountain bike, a road bike, a city bike, a cargo bike, and a recumbent bike, and an electric assist bicycle (E-bike).

In view of the state of the known technology and in accordance with a first aspect of the present disclosure, a rider-posture changing device is provided for a human-powered vehicle, and basically comprises a first member, a second member, a positioning structure and an electric actuator. The second member is configured to be movable relative to the first member. The positioning structure is configured to adjustably position the first member relative to the second member. The electric actuator is configured to actuate the positioning structure. The electric actuator includes a first electrical connector and a second electrical connector. The first electrical connector is configured to be detachably and reattachably connected to a first power supply. The second electrical connector is configured to be detachably and reattachably connected to a second power supply.

With the rider-posture changing device according to the first aspect, it is possible to selectively connect the rider-posture changing device to two different power supplies.

In accordance with a second aspect of the present disclosure, the rider-posture changing device according to the first aspect is configured so that the first power supply is configured to be detachably connected to another connector that is provided to another component of the human-powered vehicle.

With the rider-posture changing device according to the second aspect, it is possible to use the sane power supply on two different components of the human-powered vehicle.

In accordance with a third aspect of the present disclosure, the rider-posture changing device according to the first or second aspect is configured so that one of the first member and the second member is configured to mount the first power supply.

With the rider-posture changing device according to the third aspect, the power supply can be conveniently located on the rider-posture changing device.

In accordance with a fourth aspect of the present disclosure, the rider-posture changing device according to any one of the first to third aspects is configured so that the second power supply is provided to another component of the human-powered vehicle.

With the rider-posture changing device according to the fourth aspect, it is possible to use the power supply of another component of the human-powered vehicle as the power supply for the rider-posture changing device.

In accordance with a fifth aspect of the present disclosure, a rider-posture changing device is provided for a human-powered vehicle, and basically comprises a first member, a second member, a positioning structure, an electric actuator and an electric unit. The second member is configured to be movable relative to the first member. The positioning structure is configured to adjustably position the first member relative to the second member. The electric actuator is configured to actuate the positioning structure. The electric unit includes a first power supply and a wireless communicator. The electric unit is detachably and reattachably connected to the electric actuator.

With the rider-posture changing device according to the fifth aspect, it is possible to easily provide the rider-posture changing device with both a power supply and a wireless communicator in a single unit that can be selectively attached, detached and reattached.

In accordance with a sixth aspect of the present disclosure, the rider-posture changing device according to the fifth aspect is configured so that the electric unit is provided to one of the first member and the second member.

With the rider-posture changing device according to the sixth aspect, it is possible to conveniently locate the electric unit on the rider-posture changing device.

In accordance with a seventh aspect of the present disclosure, the rider-posture changing device according to any one of the fifth or sixth aspect is configured so that the first power supply includes at least one battery.

With the rider-posture changing device according to the seventh aspect, a relatively inexpensive and conventional power supply can be provided.

In accordance with an eighth aspect of the present disclosure, the rider-posture changing device according to the seventh aspect is configured so that the at least one battery includes at least one rechargeable battery.

With the rider-posture changing device according to the eighth aspect, the power supply of the rider-posture changing device can be recharged as needed.

In accordance with a ninth aspect of the present disclosure, the rider-posture changing device according to any one of the fifth to eighth aspects is configured so that the electric unit includes a housing that accommodates the wireless communicator and the first power supply, and the housing is configured such that the wireless communicator and the first power supply are detachably and reattachably connected to the electric actuator as a single unit.

With the rider-posture changing device according to the ninth aspect, it is possible to easily provide the rider-posture changing device with both a power supply and a wireless communicator in a single unit that can be selectively attached, detached and reattached.

In accordance with a tenth aspect of the present disclosure, the rider-posture changing device according to any one of the fifth to ninth aspects is configured so that the electric unit includes a substrate on which the wireless communicator is disposed.

With the rider-posture changing device according to the tenth aspect, the wireless communicator can be easily provided in the electric unit.

In accordance with an eleventh aspect of the present disclosure, the rider-posture changing device according to the tenth aspect is configured so that the substrate is disposed adjacent to the power supply.

With the rider-posture changing device according to the eleventh aspect, the power supply can be provided in a relatively compact arrangement.

In accordance with a twelfth aspect of the present disclosure, the rider-posture changing device according to any one of the fifth to eleventh aspects is configured so that the electric actuator is configured to be detachably and reattachably connected to a second power supply.

With the rider-posture changing device according to the twelfth aspect, it is possible to selectively supply electrical power to the electric actuator from another power source.

In accordance with a thirteenth aspect of the present disclosure, the rider-posture changing device according to any one of the fifth to twelfth aspects further comprises an electric controller configured to operate the electric actuator in response to a control signal.

With the rider-posture changing device according to the thirteenth aspect, it is possible to easily control the electric actuator to adjust the rider-posture changing device.

In accordance with a fourteenth aspect of the present disclosure, the rider-posture changing device according to the thirteenth aspect is configured so that the electric controller configured to selectively establish a wireless communication in a first state where the electric actuator is connected to the first power supply and a wired communication in a second state where the electric actuator is unconnected to the first power supply.

With the rider-posture changing device according to the fourteenth aspect, it is possible to easily supply electrical power from two different power sources.

In accordance with a fifteenth aspect of the present disclosure, a control system is provided for a human-powered vehicle, and comprises the rider-posture changing device according to any one of the first to fourteenth aspects. The rider posture changing device includes a communication unit and an electric controller. The control system further comprises another component of the human-powered vehicle. The another component includes another communication unit. The electric controller is configured to communicate with the another component via the another communication unit in accordance with a communication state of the communication unit of the rider-posture changing device.

With the rider-posture changing device according to the fifteenth aspect, it is possible to relay communications received by the rider posture changing device to another component either through wireless or wire communication.

In accordance with a sixteenth aspect of the present disclosure, the rider-posture changing device according to the fifteenth aspect is configured so that the electric controller is connected to at least one of a reciprocal device and a circuitry to distinguish data and power.

With the rider-posture changing device according to the sixteenth aspect, it is possible to send data signals over a power line.

In accordance with a seventeenth aspect of the present disclosure, the rider-posture changing device according to the fifteenth or sixteenth aspect is configured so that one of the first member and the second member is configured to be provided to a frame of the human-powered vehicle.

With the rider-posture changing device according to the seventeenth aspect the rider-posture changing device can be suitably located on the human-powered vehicle.

In accordance with an eighteenth aspect of the present disclosure, the rider-posture changing device according to the seventeenth aspect is configured so that the first member includes a first tube, and the second member includes a second tube, the first tube and the second tube are telescopically arranged.

With the rider-posture changing device according to the eighteenth aspect, it is possible to change the geometry of the human-powered vehicle using a telescopic rider-posture changing device.

In accordance with a nineteenth aspect of the present disclosure, the rider-posture changing device according to any one of the fifteenth to eighteenth aspects is configured so that the rider-posture changing device includes at least one of a height adjustable seatpost, a suspension, and an adjustable handlebar stem.

With the rider-posture changing device according to the nineteenth aspect, it is possible to appropriately change the geometry of the human-powered vehicle to suit the rider's posture.

Also, other objects, features, aspects and advantages of the disclosed rider-posture changing device will become apparent to those skilled in the art from the following detailed description, which, taken in conjunction with the annexed drawings, discloses preferred embodiments of the rider-posture changing device.

BRIEF DESCRIPTION OF THE DRAWINGS

Referring now to the attached drawings which form a part of this original disclosure:

FIG. 11 is a diagrammatic view of a height adjustable seatpost having a first alternate arrangement in which an electric actuator (e.g., an electric motor) and an electric unit having a first power supply and a wireless communicator are mounted to a lower portion of a first member (a first or outer tube) of the height adjustable seatpost;

FIG. 12 is a diagrammatic view of a height adjustable seatpost having a second arrangement in which an electric actuator and an electric unit having a first power supply and a wireless communicator are mounted to an upper portion of a second member (a second or inner tube) of the height adjustable seatpost;

FIG. 13 is a diagrammatic view of a height adjustable seatpost having a third arrangement in which an electric actuator is mounted to a lower portion of a first member (a first or outer tube) of the height adjustable seatpost and an electric unit having a first power supply and a wireless communicator are connected by a wire to the electric actuator;

FIG. 14 is a diagrammatic view of a height adjustable seatpost having a fourth arrangement in which an electric unit having a first power supply and a wireless communicator is mounted to an upper portion of a first member (a first or outer tube) of the height adjustable seatpost with an electric actuator mounted to a lower portion of the first member of the height adjustable seatpost;

FIG. 15 is a diagrammatic view of a height adjustable seatpost having a fifth arrangement in which an electric actuator and an electric unit having a first power supply and a wireless communicator are mounted to a lower portion of a first member (a first or outer tube) of the height adjustable seatpost;

FIG. 16 is a diagrammatic view of a height adjustable seatpost having a sixth arrangement in which an electric actuator and an electric unit having a first power supply and a wireless communicator are mounted to an upper portion of a second member (a second or inner tube) of the height adjustable seatpost;

FIG. 17 is a diagrammatic view of a height adjustable seatpost having a seventh arrangement in which an electric actuator is mounted to a lower portion of a first member (a first or outer tube) of the height adjustable seatpost and an electric unit having a first power supply and a wireless communicator are connected by a wire to the electric actuator;

FIG. 18 is an enlarged side elevational view of the height adjustable seatpost illustrated in FIG. 1;

DETAILED DESCRIPTION OF EMBODIMENTS

Selected embodiments will now be explained with reference to the drawings. It will be apparent to those skilled in the human-powered vehicle field (e.g., the bicycle field) from this disclosure that the following descriptions of the embodiments are provided for illustration only and not for the purpose of limiting the invention as defined by the appended claims and their equivalents.

Figure 1:
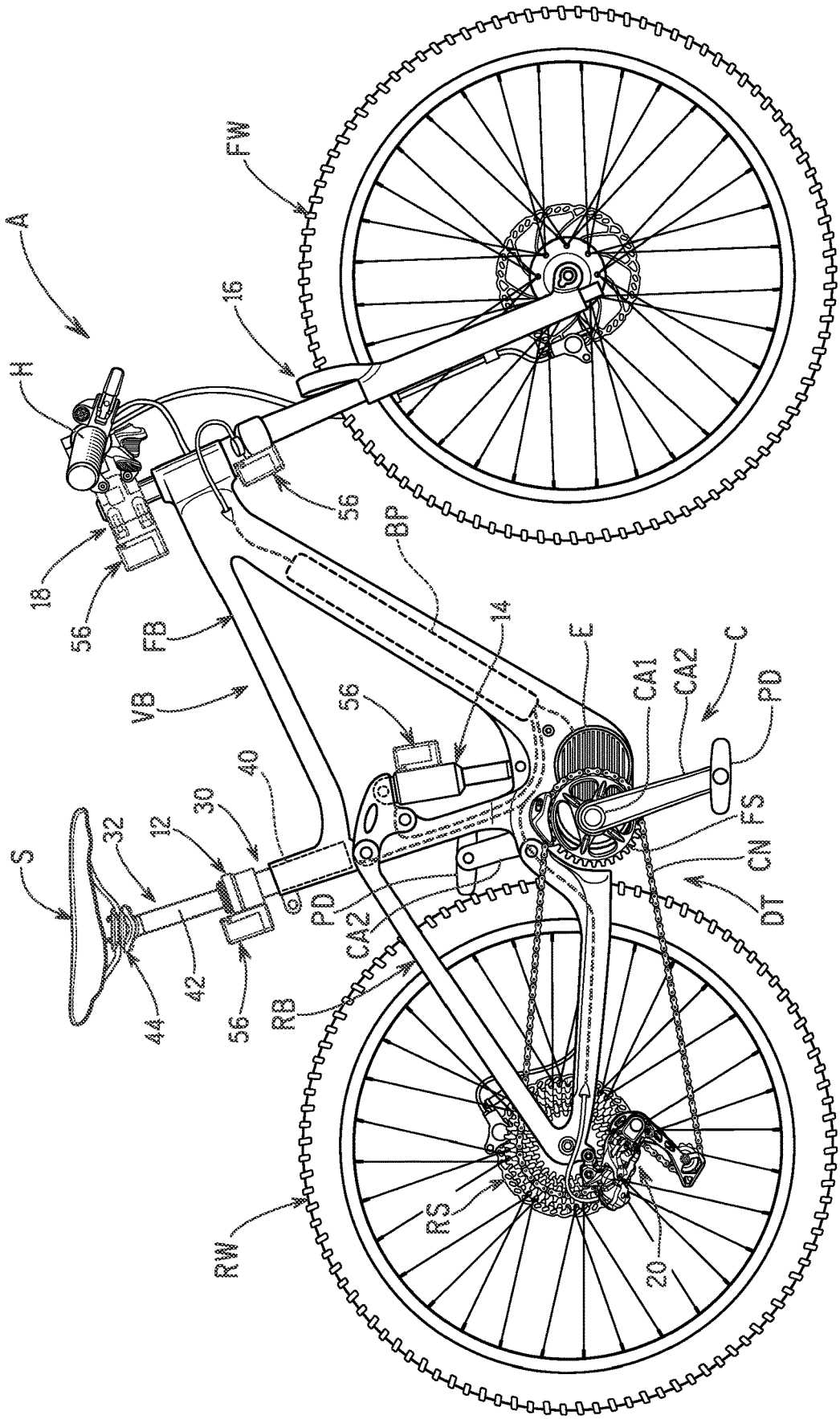
FIG. 1 is a side elevational view of a human-powered vehicle (e.g., a bicycle) that is equipped with a plurality of rider-posture changing devices (e.g., a height adjustable seatpost, a front suspension, a rear suspension, an adjustable handlebar stem and a rear derailleur) in accordance with illustrated embodiments of the present disclosure.

Referring initially to FIG. 1, an exemplary human-powered vehicle A is illustrated that is that is equipped with a plurality of rider-posture changing devices in accordance with illustrated embodiments of the present disclosure. In the illustrated embodiment, for example, the human-powered vehicle A is an electric assist mountain bike (i.e., an off-road bicycle). Alternatively, the human-powered vehicle A can be a road bicycle, a city bike, a cargo bike, and a recumbent bike, or another type of off-road bicycle such as a cyclocross bicycle. The number of wheels on the human-powered vehicle A is not limited. The human-powered vehicle A includes, for example, a monocycle and a vehicle having three or more wheels. Here, the human-powered vehicle A is a bicycle that at least partially uses human power as a driving power for traveling and includes an electric drive unit assisting the human power. In particular, a vehicle using solely an internal combustion engine as driving power is not included in the human-powered vehicle of this disclosure. More specifically, in the embodiments described below, the human-powered vehicle A is an electric assist bicycle (E-bike).

As seen in FIG. 1, the human-powered vehicle A includes a vehicle body VB that is provided with a rider-posture changing device 10 that includes at least one of a height adjustable seatpost, a suspension and an adjustable handlebar stem. In particular, the vehicle body VB is provided with a height adjustable seatpost 12, a rear suspension 14, a front suspension 16 and an adjustable handlebar stem 18. Thus, the height adjustable seatpost 12 (hereinafter simply referred to as "the seatpost 12"), the rear suspension 14, the front suspension 16 and the adjustable handlebar stem 18 (hereinafter simply referred to as "the stem 18") are examples of rider-posture changing devices that can be adjusted to change a posture of a rider by changing the geometry of the human-powered vehicle A. In other words, the rider's posture is directly changed by adjusting one or more of the seatpost 12, the rear suspension 14, the front suspension 16 and the stem 18 because the geometry of the human-powered vehicle A is changed. In any case, preferably, a rider-posture changing device (at leas one of the seatpost 12, the rear suspension 14, the front suspension 16 and the stem 18) is provided for the human-powered vehicle A.

The vehicle body VB has a front frame body FB and a rear frame body RB (a swing arm) swingably mounted to a rear section of the front frame body FB such that the rear frame body RB can pivot with respect to the front frame body FB. A rear wheel RW is mounted to the rear frame body RB and a front wheel FW is mounted to the front frame body FB via the front suspension 16 (i.e., the front suspension fork). The seatpost 12 is mounted to a seat tube of the front frame body FB in a conventional manner and supports a bicycle seat or saddle S in any suitable manner. The seatpost 12 and the saddle S form a seatpost assembly. The rear suspension 14 is provided between the front frame body FB and the rear frame body RB to control the movement of the rear frame body RB with respect to the front frame body FB. Namely, the rear suspension 14 absorbs shock added to the rear wheel RW. The front suspension 16 (i.e., a front suspension fork) is pivotally mounted to a head tube of the front frame body FB. A handlebar H is mounted to an upper end of a steerer tube of the front suspension 16. The front suspension 16 absorbs shock added to the front wheel FW. The front wheel FW is mounted to a lower end of the front suspension 16. The rear wheel RW is mounted to a rear end of the rear frame body RB.

The human-powered vehicle A further includes a drivetrain DT and an electric assist unit E operatively coupled to the drivetrain DT. Here, for example, the drivetrain DT is a chain-drive type that includes a crank C, a front sprockets FS, a plurality of rear sprockets RS and a chain CN. The crank C includes a crank axle CA1 and a pair of crank arms CA2. The crank axle CA1 is rotatably supported to the front frame body FB via the electric assist unit E. The crank arms CA2 are provided on opposite ends of the crank axle CAL A pedal PD is rotatably coupled to the distal end of each of the crank arms CA2. The drivetrain DT can be selected from any type, and can be a belt-drive type or a shaft-drive type.

The front sprocket FS is provided on the crank C to rotate integrally with the crank axle CAL The rear sprockets RS are provided on a hub HR of the rear wheel RW. The chain CN runs around the front sprocket FS and the rear sprockets RS. A human driving force is applied to the pedals PD by a rider of the human-powered vehicle A such that the driving force is transmitted via the front sprocket FS, the chain CN and the rear sprockets RS to the rear wheel RW.

The electric assist unit E is actuated to assist in propulsion of the human-powered vehicle A in a conventional manner. The electric assist unit E is actuated, for example, in accordance with a human driving force applied to the pedals PD. The electric assist unit E includes a motor. The electric assist unit E is actuated by electric power supplied from a main battery pack BP that is mounted on a downtube of the human-powered vehicle A.

Here, the human-powered vehicle A further includes a rear derailleur 20 that is attached to the rear frame body RB for shifting the chain CN between the rear sprockets RS. The rear derailleur 20 is an electric rear derailleur which will be discussed later. The rear derailleur 20 is one type of gear changing device that indirectly functions as a rider-posture changing device. By changing gears, the pedaling force for rotating the crank C changes which in turn causes the rider's posture to change.

Preferably, the main battery pack BP houses at least one battery having one or more battery cells. The main battery pack BP can be removably disposed in the downtube of the rear frame body RB. Each of the battery cells of the battery pack includes a rechargeable battery. The main battery pack BP supplies electric power to various component of the human-powered vehicle A.

Figure 2:
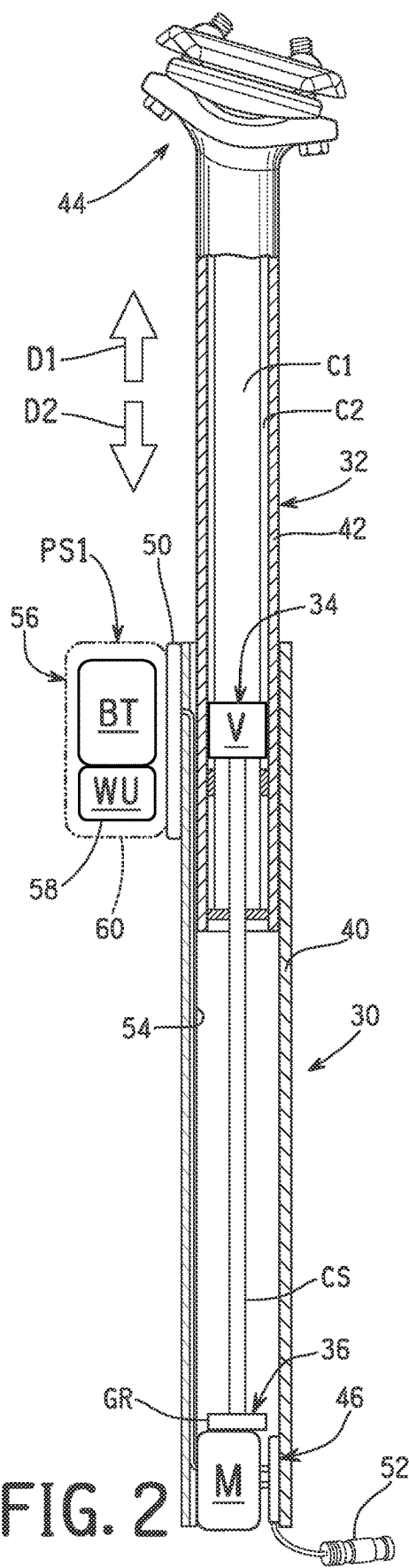
FIG. 2 is a diagrammatic view of a height adjustable seatpost set to a top (highest) position in which an electric unit having a first power supply and a wireless communicator is mounted to an upper portion of a first member (a first or outer tube) of the height adjustable seatpost with an electric actuator (e.g., an electric motor) mounted to a lower portion of the first member of the height adjustable seatpost.
Figure 3:
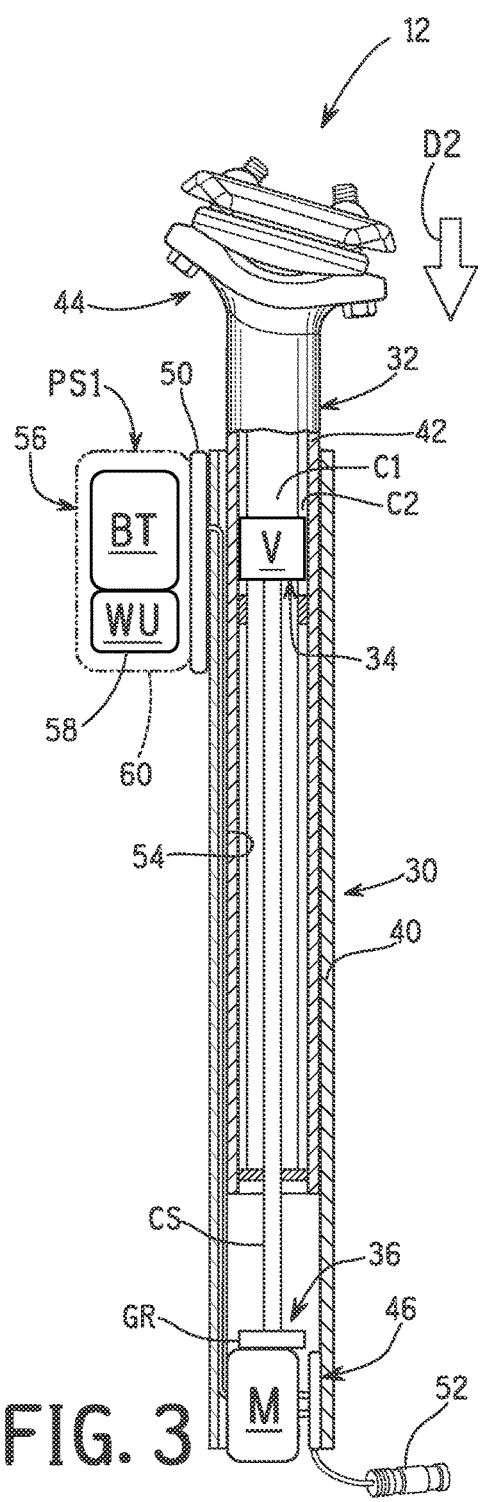
FIG. 3 is a diagrammatic view of the height adjustable seatpost illustrated in FIG. 2 but set to a bottom (lowest) position.

As seen in FIGS. 2 and 3, the seatpost 12 of FIG. 1 is diagrammatically illustrated. The seatpost 12 is set to a top (highest) position in FIG. 2 and in a bottom (lowest) position in FIG. 3. By changing an overall length of the seatpost 12, the geometry of the human-powered vehicle A is changed such that the riding posture of the rider is changed. The seatpost 12 (the rider-posture changing device) includes a first member 30, a second member 32, a positioning structure 34 and an electric actuator 36. One of the first member 30 and the second member 32 is configured to be provided to the frame (the vehicle body VB) of the human-powered vehicle A. In the case of the seatpost 12 of the embodiment of FIGS. 1 to 3, the first member 30 is configured to be received inside the seat tube of the front frame body FB in a conventional manner. Also, in the embodiment of FIGS. 1 to 3, the electric actuator 36 include a reversible electric motor M, a gear reduction unit GR and a control shaft CS. Further, in the embodiment of FIGS. 1 to 3, the positioning structure 34 includes a fluid flow control valve V that adjusts the volumes of chambers in one of the first member 30 and the second member 32 to expand or contract the seatpost 12. The electric actuator 36 is operatively coupled to the positioning structure 34 to open and close the fluid flow control valve V.

The electric actuator 36 is not limited to an arrangement that includes a motor. For example, the electric actuator 36 could include an electric solenoid for opening and closing the fluid flow control valve V or for operating some other structure of the positioning structure 34. Also, the positioning structure 34 is not limited to the illustrated fluid flow control valve arrangement, but rather can include a fluid flow control valve as shown and described in U.S. Patent Application Publication No. 2019/0054968 A1, where the electric actuator is mounted to the upper tube and controls a hydraulic port interconnecting upper and lower sections of a fluid passage in the seatpost. Furthermore, for example, the positioning structure 34 could include a gear mechanism such as a gear rack with a pinion gear to extend and retract the second member 32 relative to the first member 30. Also, alternatively, the positioning structure 34 could include a linear movement mechanism that has a drive screw provided to one of the first member 30 and the second member 32, and a screw nut provided to the other one of the first member 30 and the second member 32. This type of linear movement mechanism is disclosed in U.S. Patent Application Publication No. 2019/0054968 A1.

Here, the seatpost 12 is a telescopic apparatus. Thus, the first member 30 includes a first tube 40, and the second member 32 includes a second tube 42. The first tube 40 and the second tube 42 are telescopically arranged. The second tube 42 is configured to be telescopically received in the first tube 40. The first tube 40 and the second tube 42 are movable relative to each other in either a first movement direction D1 or a second movement direction D2. Thus, the second member 32 is configured to be movable relative to the first member 30. Alternatively, the seatpost 12 can be proved with a different structure to change the overall length of the seatpost 12 such as a linkage structure. The second tube 42 further comprises a saddle mounting structure 44 configured to fixedly mount the saddle S to the second tube 42.

The overall length of the seatpost 12 of FIGS. 2 and 3 is adjusted by changing the volumes of a first fluid chamber C1 and a second fluid chamber C2. Here, the first fluid chamber C1 and the second fluid chamber C2 are concentrically arranged. By opening the fluid flow control valve V, the first fluid chamber C1 and the second fluid chamber C2 are connected such that fluid can be moved from one of the first fluid chamber C1 and the second fluid chamber C2 to the other one of the first fluid chamber C1 and the second fluid chamber C2. When the fluid flow control valve V is closed, the volumes of the first fluid chamber C1 and the second fluid chamber C2 are maintained and the overall length of the seatpost 12 is set.

Figure 4:
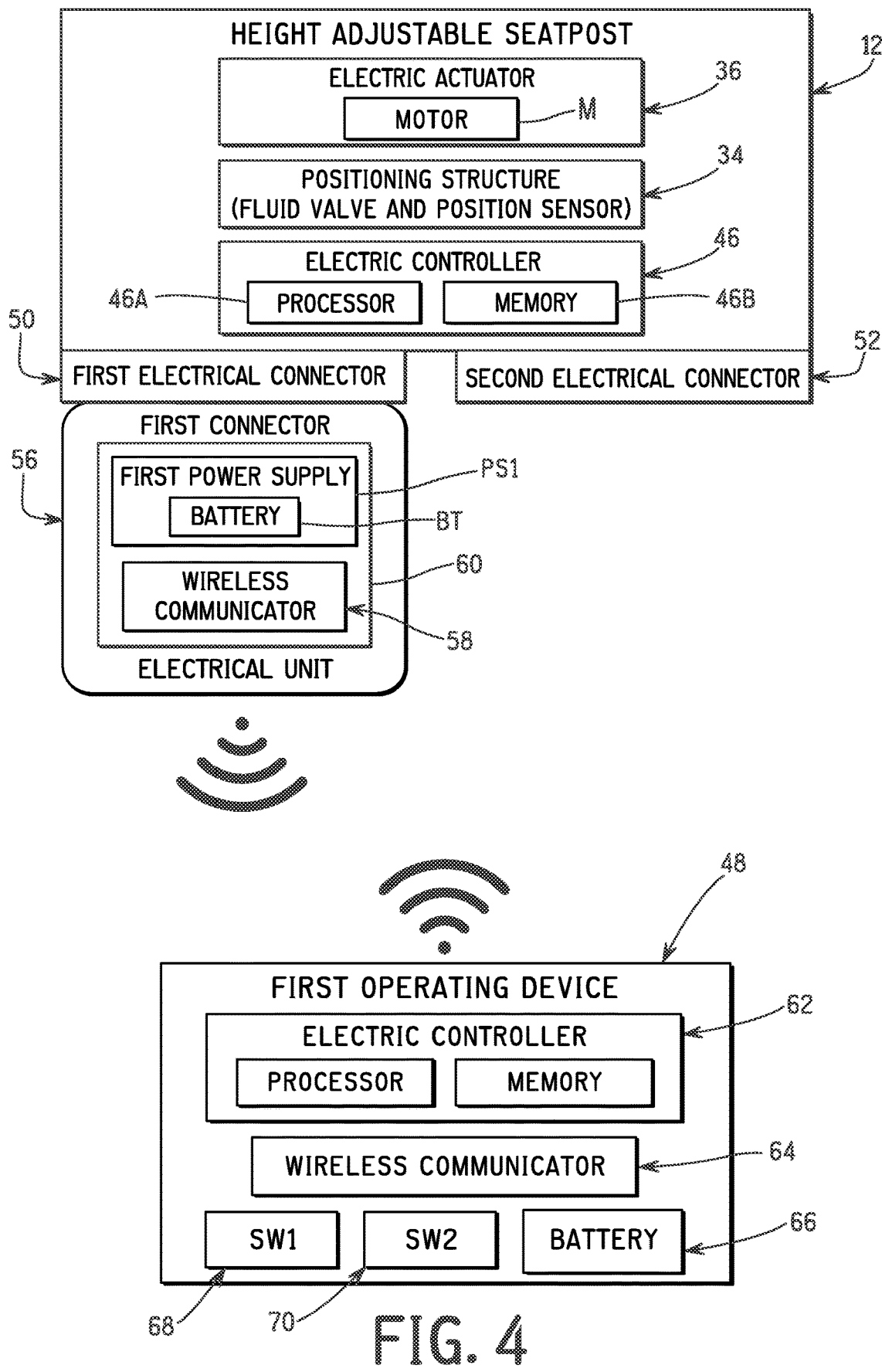
FIG. 4 is a schematic block diagram of a first configuration of the height adjustable seatpost (i.e., a rider-posture changing device) that wirelessly communicates with an operating device in which an electric unit having a first power supply and a wireless communicator is electrically connected to a first electrical connector of the height adjustable seatpost and a second power supply is electrically connected to a second electrical connector of the height adjustable seatpost.

As seen in FIG. 4, the seatpost 12 (the rider-posture changing device) further comprises an electric controller 46 that is configured to operate the electric actuator 36 in response to a control signal. Namely, the human-powered vehicle A further includes a first operating device 48 that is configured to control an overall length of the seatpost 12 by controlling the electric actuator 36, which operates the positioning structure 34 to extend or contract the second tube 42 with respect to the first tube 40. The positioning structure 34 is configured to adjustably position the first member 30 relative to the second member 32. Namely, in the case of the seatpost 12 of the illustrated embodiment as explained latter, the positioning structure 34 provides infinite adjustment positions of the first member 30 relative to the second member 32 between a top position (FIG. 2) and a bottom position (FIG. 3). The electric actuator 36 is configured to actuate the positioning structure 34. In particular, when a rider operates the first operating device 48, a control signal received by the electric controller 46, which in turn transmits a control signal to the electric actuator 36. The electric actuator 36 operates the positioning structure 34 so that the second tube 42 can be either extended or contracted with respect to the first tube 40.

Preferably, the electric controller 46 can be provided at various locations on either the first member 30 or the second member 32. In the case of the seatpost 12 of the embodiment of FIGS. 1 to 3, the electric controller 46 is located adjacent the motor M of the electric actuator 36. Alternatively, the electric controller 46 can be remotely located from the rest of the seatpost 12. For example, the electric controller 46 can be mounted on the vehicle body VB and connected to the motor M of the electric actuator 36 by a wire or other suitable electricity conveying member.

The electric controller 46 includes at least one of a central processing unit (CPU) and a micro processing unit (MPU) that includes at least one processor 46A that controls the electric actuator 36 in accordance with an operation performed on the first operating device 48 by a rider. The electric controller 46 is formed of one or more semiconductor chips that are mounted on a circuit board. Here, the "electric controller" is an "electronic controller. The terms "electric controller" and "electronic controller" as used herein refer to hardware that executes a software program, and does not include a human. The electric controller 46 further includes memory 46B that stores various types of information, control programs and control processes. The memory 46B includes any computer storage device or any non-transitory computer-readable medium with the sole exception of a transitory, propagating signal. For example, the memory 46B includes a nonvolatile memory and a volatile memory. A non-volatile memory includes, for example, at least one of a read-only memory (ROM), an erasable programmable read-only memory (EPROM), an electrically erasable programmable read-only memory (EEPROM), and a flash memory. A volatile memory includes, for example, a random access memory (RAM).

The seatpost 12 (the rider-posture changing device) further comprises a first electrical connector 50 and a second electrical connector 52. Here, the electric actuator 36 includes the first electrical connector 50 and the second electrical connector 52. In other words, the first electrical connector 50 and the second electrical connector 52 are electrically connected to the electric actuator 36. As explained later, the first electrical connector 50 is configured to be detachably and reattachably connected to a first power supply PS1. In some embodiments, one of the first member 30 and the second member 32 is configured to mount the first power supply PS1. In this way, the first power supply PS1 can be attached, detached and reattached to one of the first member 30 and the second member 32. The second electrical connector 52 is configured to be detachably and reattachably connected to a second power supply PS2 (e.g., the main battery pack BP or a power supply of another component). Here, the second electrical connector 52 is a conventional plug-in type connector that is configured to mate with another electrical connector. In this way, the second power supply PS2 can be attached, detached and reattached to the second electrical connector 52 so as to supply power and/or data to the seatpost 12.

Here, the seatpost 12 (the rider-posture changing device) further includes an electric unit 56. The electric unit 56 includes the first power supply PS1 and a wireless communicator 58. The electric unit 56 includes a housing 60 that accommodates the wireless communicator 58 and the first power supply PS1. Preferably, as explained later, the housing 60 is configured such that the wireless communicator 58 and the first power supply PS1 is detachably and reattachably connected to the electric actuator 36 as a single unit.

Here, the electric unit 56 is detachably and reattachably connected to the electric actuator 36. Namely, here, the electric unit 56 is the detachably and reattachably connected to the first electrical connector 50 between a mounted or first state and a detached or second state. The electric unit 56 is electrically and mechanically connected to the first electrical connector 50 where the electric unit 56 is mounted to the first electrical connector 50. In the mounted (first) state, the electric unit 56 is electrically connected to the motor M of the electric actuator 36 via the first electrical connector 50 and the electric controller 46 which are wired together. Thus, the first power supply PS1 supplies electrical power to the electric controller 46 and to the motor M of the electric actuator 36. Also, the wireless communicator 58 is configured to receive wireless signals from the first operating device 48. The wireless signals received by the wireless communicator 58 from the first operating device 48 are transmitted from the electric unit 56 by wired communication to the electric controller 46 for controlling the motor M of the electric actuator 36.

Here, the first power supply PS1 includes at least one battery BT. Preferably, the at least one battery BT includes at least one rechargeable battery. For example, the battery or batteries BT can be a lithium-ion battery. Alternatively, the first power supply PS1 can include a capacitor or other electrical energy storage device. Preferably, the battery or batteries BT have contacts or an electrical connector such that the battery or batteries BT are can be removed from the housing 60 without tools and replaced with new battery or batteries without tools.

The wireless communicator 58 is a hardware device that is at least capable of receiving a control signal wirelessly. Thus, the wireless communicator 58 can be a wireless receiver if it only needs to receive signals from an operating device such as the first operating device 48. Alternatively, the wireless communicator 58 can be a wireless transceiver or a wireless transmitter-receiver when it is desirable for the wireless communicator 58 to wirelessly transmit a control signal. For example, the wireless communicator 58 can wirelessly communicate to another of the components of the human-powered vehicle A that has a wireless communicator. The wireless communication signals of the wireless communicator 58 can be radio frequency (RF) signals, ultra-wide band communication signals, ANT+ communications, or Bluetooth® communications or any other type of signal suitable for short range wireless communications as understood in the human-powered vehicle field.

In the FIG. 4, a first configuration of the seatpost 12 is schematically illustrated in which the electric unit 56 is attached to the first electrical connector 50. In this way, the at least one battery BT of the first power supply PS1 supplies electrical power to the electric controller 46 and to the motor M of the electric actuator 36. Also, with the first configuration, the wireless communicator 58 receives wireless signals from the first operating device 48 and transmits the signals by wired communication to the electric controller 46 for controlling the motor M of the electric actuator 36.

As seen in FIG. 4, the first operating device 48 includes an electric controller 62, a wireless communicator 64, a battery 66, a first switch 68 and a second switch 70. Using the electric controller 62 and the wireless communicator 64, the first operating device 48 can wirelessly communicate with the seatpost 12 by operating the first switch 68. The second switch 70 can be omitted when only being used for the seatpost 12. However, when the first operating device 48 is used for control one or more components of the human-powered vehicle A such as the rear derailleur 20, the first switch 68 can be used for upshifting and the second switch 70 can be used for downshifting. Also, for example, the first switch 68 and the second switch 70 can be pressed simultaneously to switch the first operating device 48 from operating the seatpost 12 to operating the rear derailleur 20 or another component of the human-powered vehicle A. Here, the first switch 68 and the second switch 70 are push button switches, but first switch 68 and the second switch 70 are not limited to push button switches.

Basically, when a rider wants to lower the saddle S, the rider pushes the first switch 68 to open the fluid flow control valve V and sits on the saddle S so that the second tube 42 is telescopically retracted into the first tube 40. When a rider wants to raise the saddle S, the rider pushes the first switch 68 to open the fluid flow control valve V and lifts off the saddle S so that the second tube 42 is telescopically extends from the first tube 40. By sitting on the saddle S while maintaining the first switch 68 in the depressed state, the rider can change the overall length of the seatpost 12 to a desired position, and then lock in the position by releasing the first switch 68.

The electric controller 62 includes at least one of a central processing unit (CPU) and a micro processing unit (MPU) that includes at least one processor 62A that controls the wireless communicator 64 in accordance with an operation of the first switch 68 and/or the second switch 70 by a rider. Preferably, the first operating device 48 can be programmed by a user such that the first operating device 48 can be used for other electric components as needed and/or desired.

The electric controller 62 is formed of one or more semiconductor chips that are mounted on a circuit board. The electric controller 62 further includes memory 62B that stores various types of information, control programs and control processes. The memory 62B includes any computer storage device or any non-transitory computer-readable medium with the sole exception of a transitory, propagating signal. For example, the memory 62B includes a nonvolatile memory and a volatile memory. A non-volatile memory includes, for example, at least one of a read-only memory (ROM), an erasable programmable read-only memory (EPROM), an electrically erasable programmable read-only memory (EEPROM), and a flash memory. A volatile memory includes, for example, a random access memory (RAM).

The wireless communicator 64 is a hardware device capable of receiving a control signal wirelessly. Thus, the wireless communicator 64 can be a wireless receiver. Alternatively, the wireless communicator 64 can be a wireless transceiver or a wireless transmitter-receiver when it is desirable for the wireless communicator 64 to wirelessly transmit a control signal. The wireless communication signals of the wireless communicator 64 can be radio frequency (RF) signals, ultra-wide band communication signals, ANT+ communications, or Bluetooth® communications or any other type of signal suitable for short range wireless communications as understood in the human-powered vehicle field.

Figure 5:
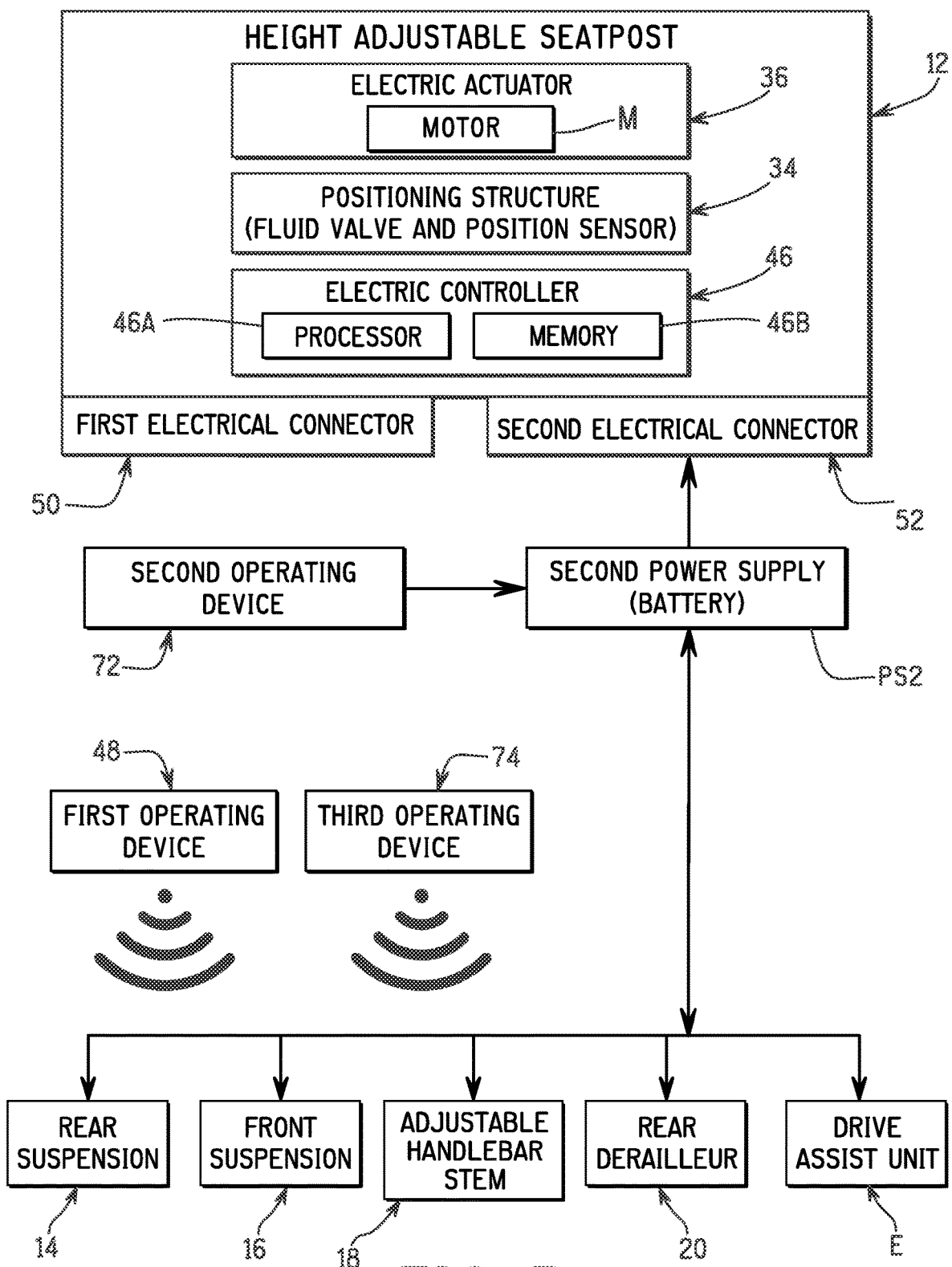
FIG. 5 is a schematic block diagram of a second configuration of the height adjustable seatpost that communicates with an operating device via a wired communication.

In the FIG. 5, a second configuration of the seatpost 12 is schematically illustrated in which the electric unit 56 is detached from the first electrical connector 50, and in which the second electrical connector 52 is connected to the second power supply PS2. In this configuration, the first operating device 74 third operating device 74

The wireless communicator 58 also receives wireless signals from a third operating device 74 and transmits the signals by wired communication to another component (e.g., the rear suspension 14, the front suspension 16, the stem 18 and the rear derailleur 20) of the human-powered vehicle A.

In this way, the second power supply PS2 supplies electrical power to the electric controller 46 and to the motor M of the electric actuator 36. Also, with the second configuration, the electric controller 46 receives wired signals from a second operating device 72 via power line communication (PLC). Thus, the seatpost 12, the second operating device 72 and the second power supply PS2 each includes a power line communication interface for communicating via power lines using power line communications (PLC). Alternatively, the seatpost 12, the second operating device 72 and the second power supply PS2 can be connected by one or more dedicated signal wire (directly or indirectly). The second power supply PS2 can be an electrical power supply from any one of the other electric components (e.g., the rear suspension 14, the front suspension 16, the stem 18 and the rear derailleur 20) or the main battery pack BP.

Figure 6:
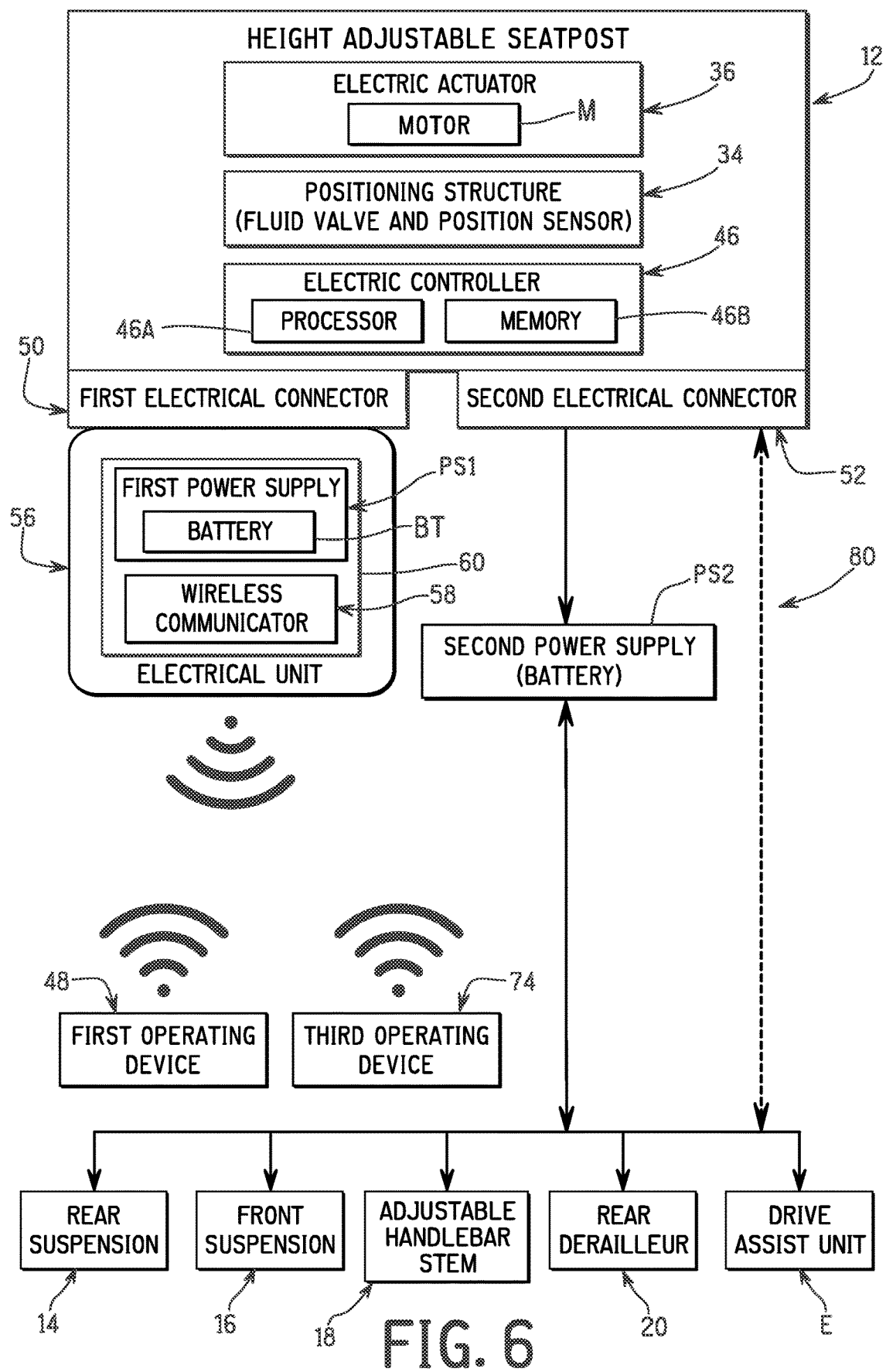
FIG. 6 is a schematic block diagram of a third configuration of the height adjustable seatpost that communicates with that wirelessly communicates with an operating device and that that communicates with another component (e.g., one or more of the front suspension, the rear suspension, the adjustable handlebar stem and the rear derailleur) of the human-powered vehicle via a wired communication.

In the FIG. 6, a third configuration of the seatpost 12 is schematically illustrated in which the electric unit 56 is attached to the first electrical connector 50 and in which the second electrical connector 52 is connected to the second power supply PS2. In this way, the at least one battery BT of the first power supply PS1 supplies electrical power to the electric controller 46 and to the motor M of the electric actuator 36. Also, with the third configuration, the wireless communicator 58 receives wireless signals from the first operating device 48 and transmits the signals by wired communication to the electric controller 46 for controlling the motor M of the electric actuator 36. The wireless communicator 58 also receives wireless signals from a third operating device 74 and transmits the signals by wired communication to another component (e.g., the rear suspension 14, the front suspension 16, the stem 18 and the rear derailleur 20) of the human-powered vehicle A. The third operating device 74 can have the same configuration as the first operating device 48 or a different configuration. In any case, preferably, the third operating device 74 includes an electric controller, a wireless communicator, a battery and one or more user inputs (e.g., switches, levers, etc.).

FIG. 6 illustrates one example of a control system 80 for the human-powered vehicle A. The control system 74 comprises a rider-posture changing device. Here, the control system 74 comprises a plurality of rider-posture changing devices in which the seatpost 12 act as a first tier rider posture changing device while the rear suspension 14, the front suspension 16, the stem 18 and the rear derailleur 20 act as second tier rider posture changing devices. In other words, the electric unit 56 is mounted to the seatpost 12 so that the wireless signals from the first operating device 48 and the third operating device 74 are received by the wireless communicator 58 and then communicated to the electric controller 46 of the seatpost 12. Then, the electric controller 46 of the seatpost 12 communicates with another component of the human-powered vehicle A via wired communications. In this way, when the seatpost 12 is adjusted, one or more of the other components (e.g., the rear suspension 14, the front suspension 16, the stem 18 and the rear derailleur 20) can be adjusted based on the adjustment of the seatpost 12.

Figure 7:
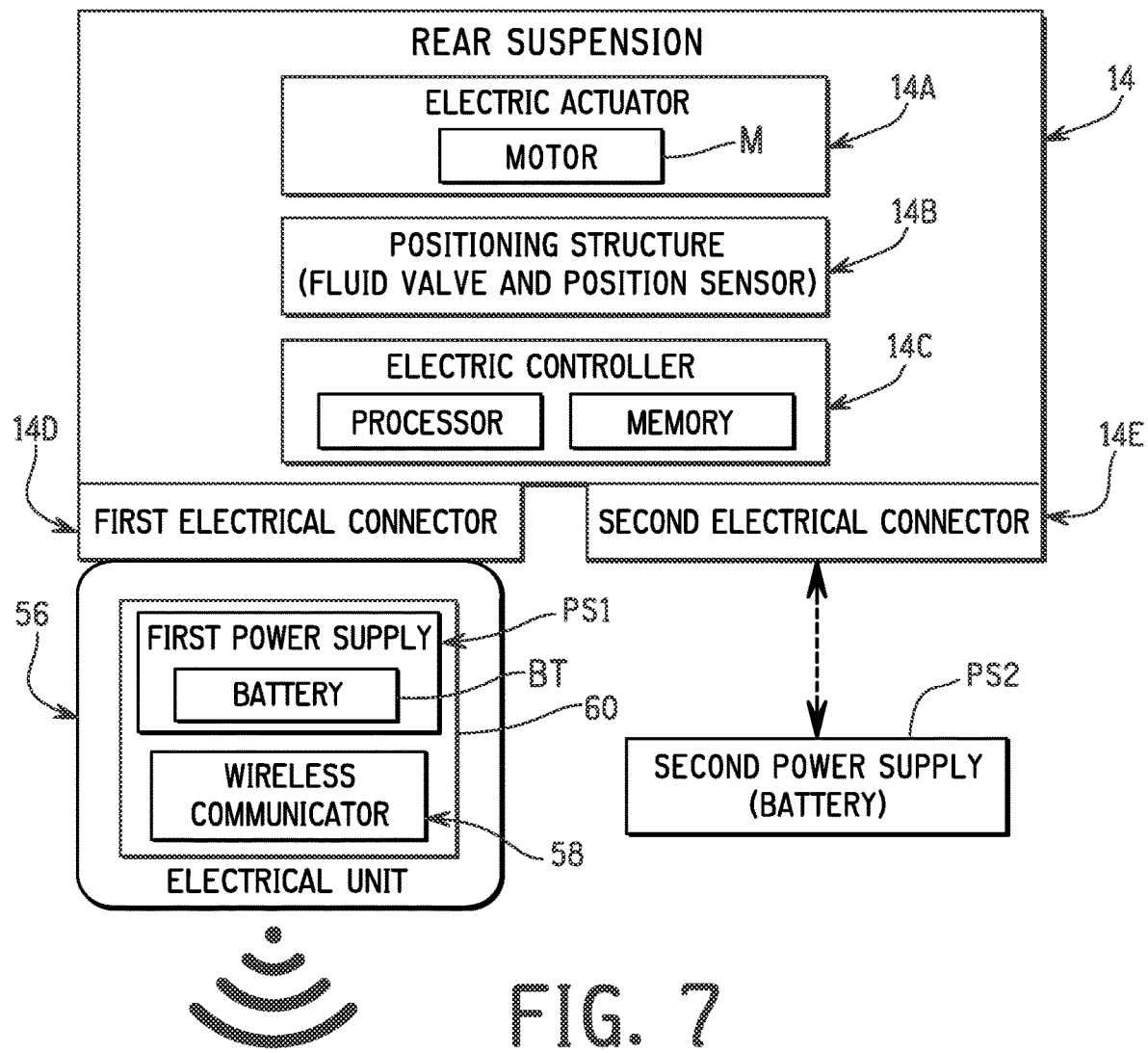
FIG. 7 is a schematic block diagram of a first configuration of the rear suspension (i.e., a rider-posture changing device) in which an electric unit having a first power supply and a wireless communicator is electrically connected to a first electrical connector and a second power supply is electrically connected to a second electrical connector.

As seen in FIG. 7, the rear suspension 14 is schematically illustrated. Similar to the seatpost 12, the rear suspension 14 includes an electric actuator 14A, a positioning structure 14B and an electric controller 14C for adjusting a stroke length. The rear suspension 14 also includes a first electrical connector 14D and a second electrical connector 14E. The first electrical connector 14D is identical to the first electrical connector 50, and the second electrical connector 14E is identical to the second electrical connector 52. The first electrical connector 14D is configured to detachably receive the electric unit 56. In this way, the same electric unit can be used for the rear suspension 14 as is used for the seatpost 12. In other words, the first power supply PS1 is configured to be detachably connected to another connector that is provided to another component of the human-powered vehicle A. The second electrical connector 14E is configured to be detachably connected to the second power supply PS2 (e.g., the main battery pack BP or a power supply of another component). In other words, the second power supply PS2 (e.g., the main battery pack BP or the power supply BT of another component) is provided to another component of the human-powered vehicle A. In this way, the rear suspension 14 can be configured to receive electrical power from either the first second power supply PS1 similar to FIG. 4, or the second power supply PS2 similar to FIG. 5. Also, the rear suspension 14 can be configured similar to FIG. 6 so that the rear suspension 14 wirelessly receives signals from the first operating device 48 and the third operating device 74 and then communicates the signals to another component (e.g., the seatpost 12, the front suspension 16, the stem 18 and the rear derailleur 20) of the human-powered vehicle A. Thus, the rear suspension 14 act as a first tier rider posture changing device while the seatpost 12, the front suspension 16, the stem 18 and the rear derailleur 20 act as second tier rider posture changing devices. In this way, when the rear suspension 14 is adjusted, one or more of the other components (e.g., the seatpost 12, the front suspension 16, the stem 18 and the rear derailleur 20) can be adjusted based on the adjustment of the seatpost 12.

Figure 8:
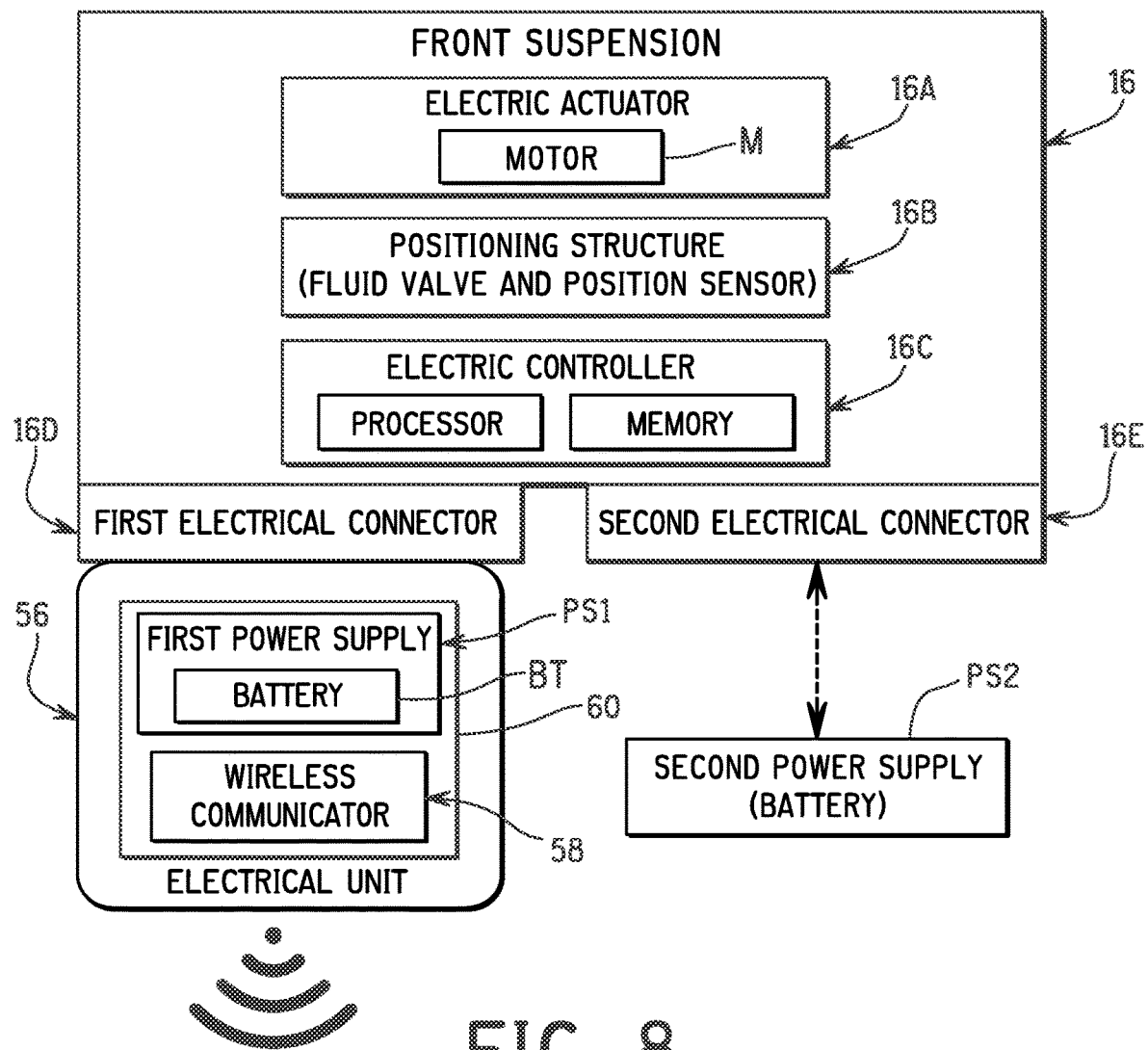
FIG. 8 is a schematic block diagram of a first configuration of the front suspension (i.e., a rider-posture changing device) in which an electric unit having a first power supply and a wireless communicator is electrically connected to a first electrical connector and a second power supply is electrically connected to a second electrical connector.

As seen in FIG. 8, the front suspension 16 is schematically illustrated. Similar to the seatpost 12, the front suspension 16 includes an electric actuator 16A, a positioning structure 16B and an electric controller 16C for adjusting a stroke length. The front suspension 16 also includes a first electrical connector 16D and a second electrical connector 16E. The first electrical connector 16D is identical to the first electrical connector 50, and the second electrical connector 16E is identical to the second electrical connector 52. The first electrical connector 16D is configured to detachably receive the electric unit 56. In this way, the same electric unit can be used for the front suspension 16 as is used for the seatpost 12. The second electrical connector 16E is configured to be detachably connected to the second power supply PS2 (e.g., the main battery pack BP or a power supply of another component). In this way, the front suspension 16 can be configured to receive electrical power from either the first second power supply PS1 similar to FIG. 4, or the second power supply PS2 similar to FIG. 5. Also, the front suspension 16 can be configured similar to FIG. 6 so that the front suspension 16 wirelessly receives signals from the first operating device 48 and the third operating device 74 and then communicates the signals to another component (e.g., the seatpost 12, the rear suspension 14, the stem 18 and the rear derailleur 20) of the human-powered vehicle A. Thus, the front suspension 16 act as a first tier rider posture changing device while the seatpost 12, the rear suspension 14, the stem 18 and the rear derailleur 20 act as second tier rider posture changing devices. In this way, when the front suspension 16 is adjusted, one or more of the other components (e.g., the seatpost 12, the rear suspension 14, the stem 18 and the rear derailleur 20) can be adjusted based on the adjustment of the seatpost 12.

Figure 9:
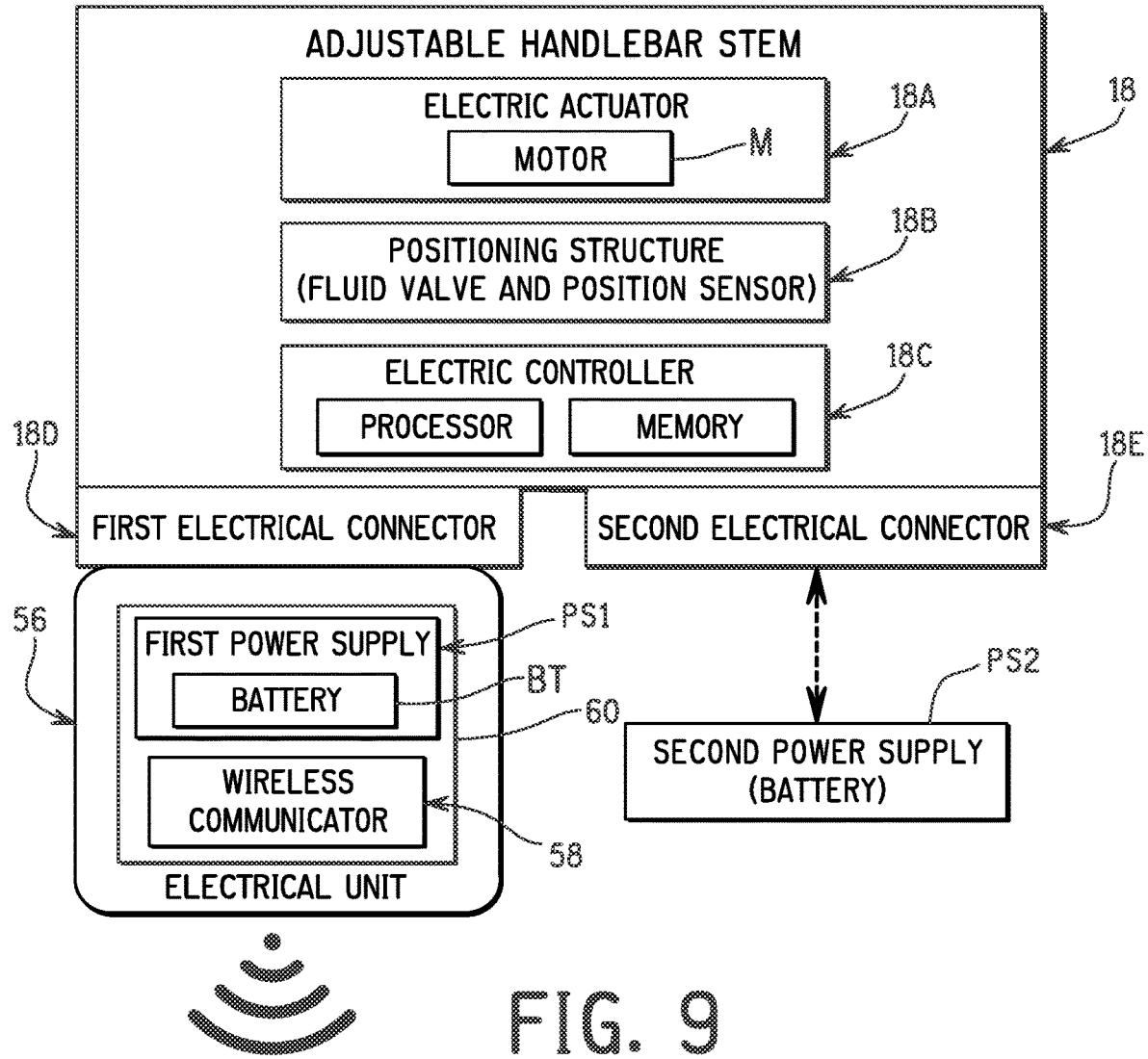
FIG. 9 is a schematic block diagram of a first configuration of the adjustable handlebar stem (i.e., a rider-posture changing device) in which an electric unit having a first power supply and a wireless communicator is electrically connected to a first electrical connector and a second power supply is electrically connected to a second electrical connector.

As seen in FIG. 9, the stem 18 is schematically illustrated. Similar to the seatpost 12, the stem 18 includes an electric actuator 18A, a positioning structure 18B and an electric controller 18C for adjusting a stroke length. The stem 18 also includes a first electrical connector 18D and a second electrical connector 18E. The first electrical connector 18D is identical to the first electrical connector 50, and the second electrical connector 18E is identical to the second electrical connector 52. The first electrical connector 18D is configured to detachably receive the electric unit 56. In this way, the same electric unit can be used for the stem 18 as is used for the seatpost 12. The second electrical connector 18E is configured to be detachably connected to the second power supply PS2 (e.g., the main battery pack BP or a power supply of another component). In this way, the stem 18 can be configured to receive electrical power from either the first second power supply PS1 similar to FIG. 4, or the second power supply PS2 similar to FIG. 5. Also, the stem 18 can be configured similar to FIG. 6 so that the stem 18 wirelessly receives signals from the first operating device 48 and the third operating device 74 and then communicates the signals to another component (e.g., the seatpost 12, the rear suspension 14, the front suspension 16 and the rear derailleur 20) of the human-powered vehicle A. Thus, the stem 18 act as a first tier rider posture changing device while the seatpost 12, the rear suspension 14, the front suspension 16 and the rear derailleur 20 act as second tier rider posture changing devices. In this way, when the stem 18 is adjusted, one or more of the other components (e.g., the seatpost 12, the rear suspension 14, the front suspension 16 and the rear derailleur 20) can be adjusted based on the adjustment of the seatpost 12.

Figure 10:
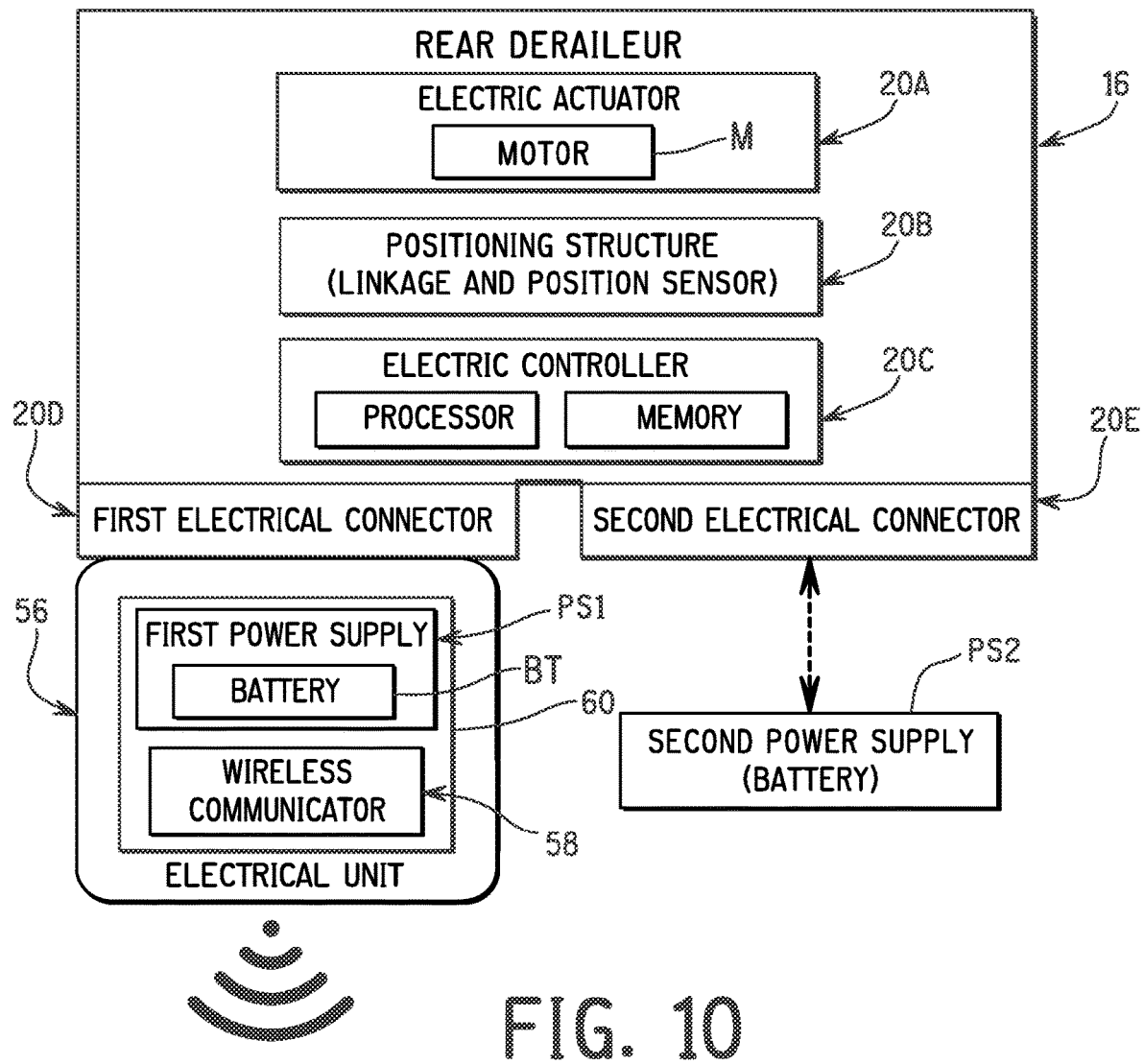
FIG. 10 is a schematic block diagram of a first configuration of the rear derailleur (i.e., a rider-posture changing device) in which an electric unit having a first power supply and a wireless communicator is electrically connected to a first electrical connector and a second power supply is electrically connected to a second electrical connector.

As seen in FIG. 10, the rear derailleur 20 is schematically illustrated. Similar to the seatpost 12, the rear derailleur 20 includes an electric actuator 20A, a positioning structure 20B and an electric controller 20C for adjusting a stroke length. The rear derailleur 20 also includes a first electrical connector 20D and a second electrical connector 20E. The first electrical connector 20D is configured to detachably receive an electric unit 56A that has the same basic configuration as the electric unit 56, but the housing has been reconfigured to be mounted to the rear derailleur 20. Alternatively, the first electrical connector 20D can be configured to be the same as the first electrical connector 50 so that the electric unit 56 can be provided to the rear derailleur 20. The second electrical connector 20E is configured to be connected to the second power supply PS2 (e.g., the main battery pack BP or a power supply of another component). In this way, the rear derailleur 20 can be configured to receive electrical power from either the first second power supply PS1 similar to FIG. 4, or the second power supply PS2 similar to FIG. 5. Also, the rear derailleur 20 can be configured similar to FIG. 6 so that the rear derailleur 20 wirelessly receives signals from the first operating device 48 and the third operating device 74 and then communicates the signals to another component (e.g., the seatpost 12, the rear suspension 14, the front suspension 16 and the stem 18) of the human-powered vehicle A. Thus, the rear derailleur 20 act as a first tier rider posture changing device while the seatpost 12, the rear suspension 14, the front suspension 16 and the stem 18 act as second tier rider posture changing devices. In this way, when the rear derailleur 20 is adjusted, one or more of the other components (e.g., the seatpost 12, the rear suspension 14, the front suspension 16 and the stem 18) can be adjusted based on the adjustment of the seatpost 12.

Accordingly, as seen in FIGS. 4 to 10, the components of the control system 80 can be easily configured in a variety of arrangements by change wired connections and which of the components includes one of the electric unit 56. In any case, in the control system 80, one of the rider posture changing device includes a communication unit (either a wireless communicator or a wired connection) and an electric controller. Also, the control system 80 further comprises another component of the human-powered vehicle A. The another component includes another communication unit. Thus, in one preferred configuration, the control system 80 preferably includes at least two components that can communicate with each other via wired and/or wireless communications.

As can be seen from FIGS. 4 to 6, the electric controller 46 is configured to selectively establish a wireless communication in a first state where the electric actuator 36 is connected to the first power supply PS1 and a wired communication in a second state where the electric actuator 36 is unconnected to the first power supply PS1. In other words, when the electric unit 56 electrically connected to the first electrical connector 50 as seen in FIGS. 4 and 5, the electric controller 46 is configured to selectively establish a wireless communication with the first operating device 48 and the third operating device 74 and another component (e.g., the seatpost 12, the front suspension 16, the stem 18 and the rear derailleur 20) of the human-powered vehicle A which also includes the electric unit 56 with the wireless communicator 58. However, when the electric unit 56 is disconnected from the first electrical connector 50, the electric controller 46 is configured to determine the second state exists and a wired communication is established for transmitting and/or receiving signals via the power lines. For example, the electric controller 46 is connected to at least one of a reciprocal device and a circuitry to distinguish data and power. Thus, the electric controller 46 is capable of processing data (including control signal, information of current state, etc.) that is transmitted thru the power line. Also, the electric controller 46 is configured to communicate with the another component via the another communication unit in accordance with a communication state of the communication unit of the rider-posture changing device. In other words, the electric controller 46 is configured to determine based on the connections of the components of the human-powered vehicle A whether to communicate via wireless communication or wired communication with another component.

Turning now to FIGS. 11 to 13, three seatpost configurations are schematically illustrated to show alternate locations for the electric actuator 36 and the electric unit 56. It will be apparent from this disclosure that the location, shape and/or size of the electric actuator 36 and the electric unit 56 are not limited to the illustrated configuration. Rather, the seatpost 12 can be configured such that the electric unit 56 can be located in a variety of other suitable locations on the seatpost 12, or remotely located from the seatpost 12 by a wire. Also, the size and shape of the electric unit 56 can be changed according to the size of electronics used in the electric unit 56 as well as other design considerations. FIGS. 11 to 13 show some selected examples for locations of the electric actuator 36 and the electric unit 56.

The overall length of the seatpost 12 of FIGS. 11 to 13 is adjusted by changing the volumes of a first fluid chamber C1 and a second fluid chamber C2. By opening the fluid flow control valve V, the first fluid chamber C1 and the second fluid chamber C2 are connected such that fluid can be moved from one of the first fluid chamber C1 and the second fluid chamber C2 to the other one of the first fluid chamber C1 and the second fluid chamber C2. When the fluid flow control valve V is closed, the volumes of the first fluid chamber C1 and the second fluid chamber C2 are maintained and the overall length of the seatpost 12 is set. As seen in FIG. 11, the seatpost 12 is illustrated in which the electric unit 56 is provided to a bottom portion of the first member 30 together with the electric actuator 36. As seen in FIG. 12, the seatpost 12 is illustrated in which the electric actuator 36 and the electric unit 56 are provided to a top portion of the second member 32. As seen in FIG. 13, the seatpost 12 is illustrated in which the electric actuator 36 is mounted to a bottom portion of the first member 30 and the electric unit 56 is connected by a wire W to the electric actuator 36. Preferably, one or both ends of the wire W has a plug-in type connector for attaching, detaching and reattaching the wire W to the electric unit 56 and/or the motor M. In this way, the electric unit 56 can be mounted remote to the seatpost 12A. Thus, in some embodiments, the electric unit 56 is provided to one of the first member 30 and the second member 32. In other embodiments, the electric unit 56 also can be disposed peripheral to the first member 30 and the second member 32. For example, the electric unit 56 can be mounted to the saddle S or mounted to the front frame body FB.

Turning now to FIGS. 14 to 17, four seatpost configurations are schematically illustrated to show a seatpost 12A with the first fluid chamber C1 and the second fluid chamber C2 having a different arrangement, and to show alternate locations for the electric actuator 36 and the electric unit 56. As seen in FIG. 14, the seatpost 12A is illustrated in which the electric unit 56 is provided to a top portion of the first member 30 together with the electric actuator 36. As seen in FIG. 15, the seatpost 12A is illustrated in which the electric unit 56 is provided to a bottom portion of the first member 30 together with the electric actuator 36. As seen in FIG. 16, the seatpost 12A is illustrated in which the electric actuator 36 and the electric unit 56 are provided to a top portion of the second member 32. As seen in FIG. 17, the seatpost 12A is illustrated in which the electric actuator 36 is mounted to a bottom portion of the first member 30 and the electric unit 56 is connected by a wire W to the electric actuator 36. Preferably, one or both ends of the wire W has a plug-in type connector for attaching, detaching and reattaching the wire W to the electric unit 56 and/or the motor M.

Turning now to FIGS. 18 to 23, the seatpost 12 will be discussed in more concrete detail. The seatpost 12 is provided on a seat tube of the front frame body FB, and is configured to change the height of the saddle S. The seatpost 12 is an electric seatpost that is configured to be extended and retracted by the electric actuator 36. Here, the electric actuator 36 of the seatpost 12 controls the valve V such that air or gas applies a force to extend the seatpost 12, while a human force is applied to the saddle S to retract the seatpost 12.

Figure 20:
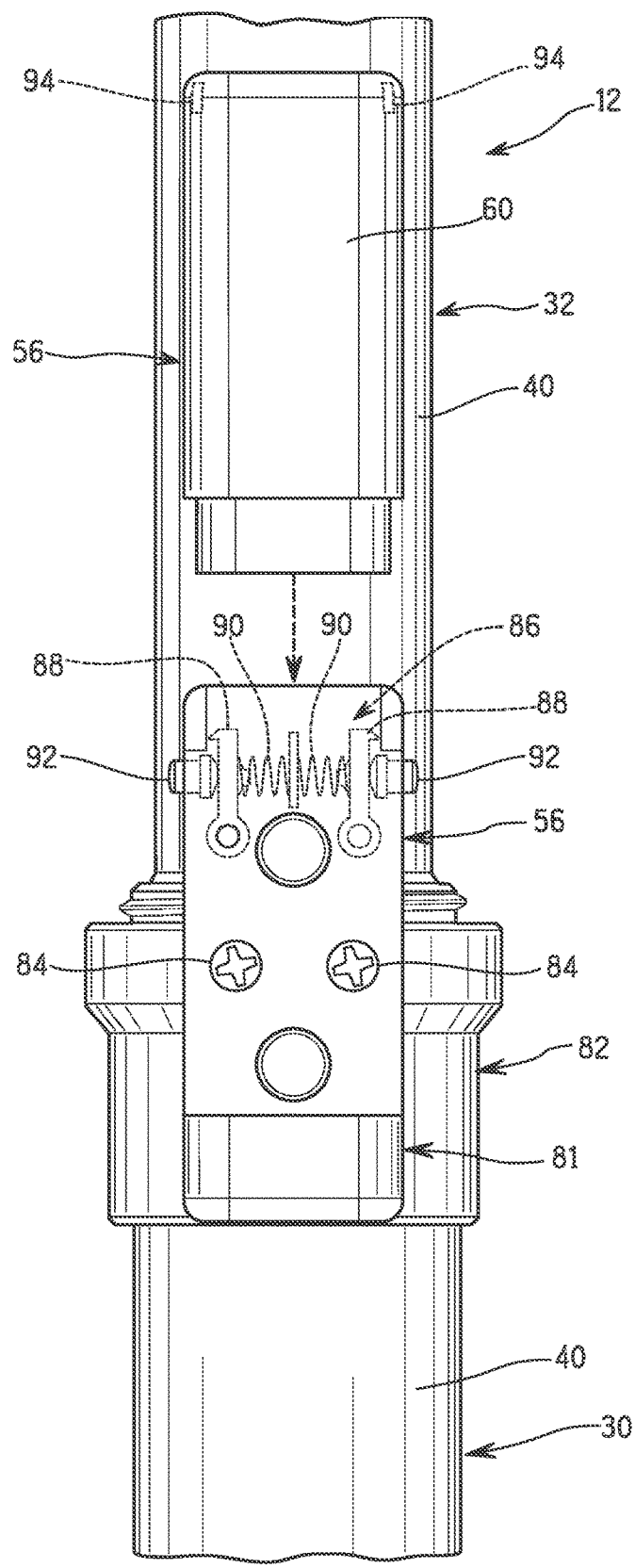
FIG. 20 is an enlarged rear view of the middle portion of the height adjustable seatpost illustrated in FIG. 19 in which the electric unit is detached.

As mentioned above, the seatpost 12 is a telescopic apparatus in which the first member 30 includes the first tube 40, and the second member 32 includes the second tube 42. The second tube 42 is configured to be telescopically received in the first tube 40. The second tube 42 further comprises a saddle mounting structure 44 configured to fixedly mount the saddle S to the second tube 42. Here, the first electrical connector 50 has a base 81 that is attached to a collar member 82 of the first member 30 by a pair of screws 84 as seen in FIG. 20. In addition to electrically connecting the electric unit 56 to the electric actuator 36 and the electric controller 46, the first electrical connector 50 is also configured to support and attach the electric unit 56 to the first tube 40.

As seen in FIG. 18, the second electrical connector 52 is a plug-in type connector that is configured to mate with another electrical connector 85 that is electrical connected to the second power supply PS2. In this way, second electrical connector 52 is detachably connected to the second power supply PS2 in a reattachable manner without using tools. The second electrical connector 52 can be either a male member or a female member. The second power supply PS2 can be either the main battery pack BP or the power supply BT of another component (e.g., the rear suspension 14, the front suspension 16, the stem 18 and the rear derailleur 20) of the human-powered vehicle A.

As mentioned above, the electric actuator 36 is wired to the electric controller 46 and the wired to the electric actuator 36 such that the electric actuator 36 is controlled by the electric controller 46. The first electrical connector 50 and the second electrical connector 52 are wired to a substrate on which the electric controller 46 is provided. Thus, the electric controller 46 is configured to receive power and data that is inputted via either the first electrical connector 50 or the second electrical connector 52. In this way, power can be supplied to the electric actuator 36 via the first electrical connector 50 and the second electrical connector 52. Since the first power supply PS1 is detachable and reattachable to the first electrical connector 50, the electric actuator 36 is configured to be detachably and reattachably connected to the first power supply PS1. Likewise, since the second power supply PS2 is detachable and reattachable to the second electrical connector 52, the electric actuator 36 is configured to be detachably and reattachably connected to the second power supply PS2 (e.g., the main battery pack BP or a power supply of another component).

As seen in FIG. 20, the first electrical connector 50 includes an attachment mechanism 86 for attaching, detaching and reattaching the electric unit 56 to the electrical connector 50. In this way, for example, the battery (i.e., the first power supply PS1) is configured to be detachably connected to electrical connector 50. Here, the attachment mechanism 86 includes two latches 88 that are pivotally attached to the base 81 and biased towards latching positions by biasing elements 90 (e.g., springs). The attachment mechanism 86 further includes a pair of user operated members 92. The user operated members 92 are movably provided to the base 81 and engaged with the latches 88. The user squeezes the user operated members 92 together to move the latches 88 from the latching positions to releasing positions. The latches 88 engages notches 94 in the housing 60 of the electric unit 56.

Figure 19:
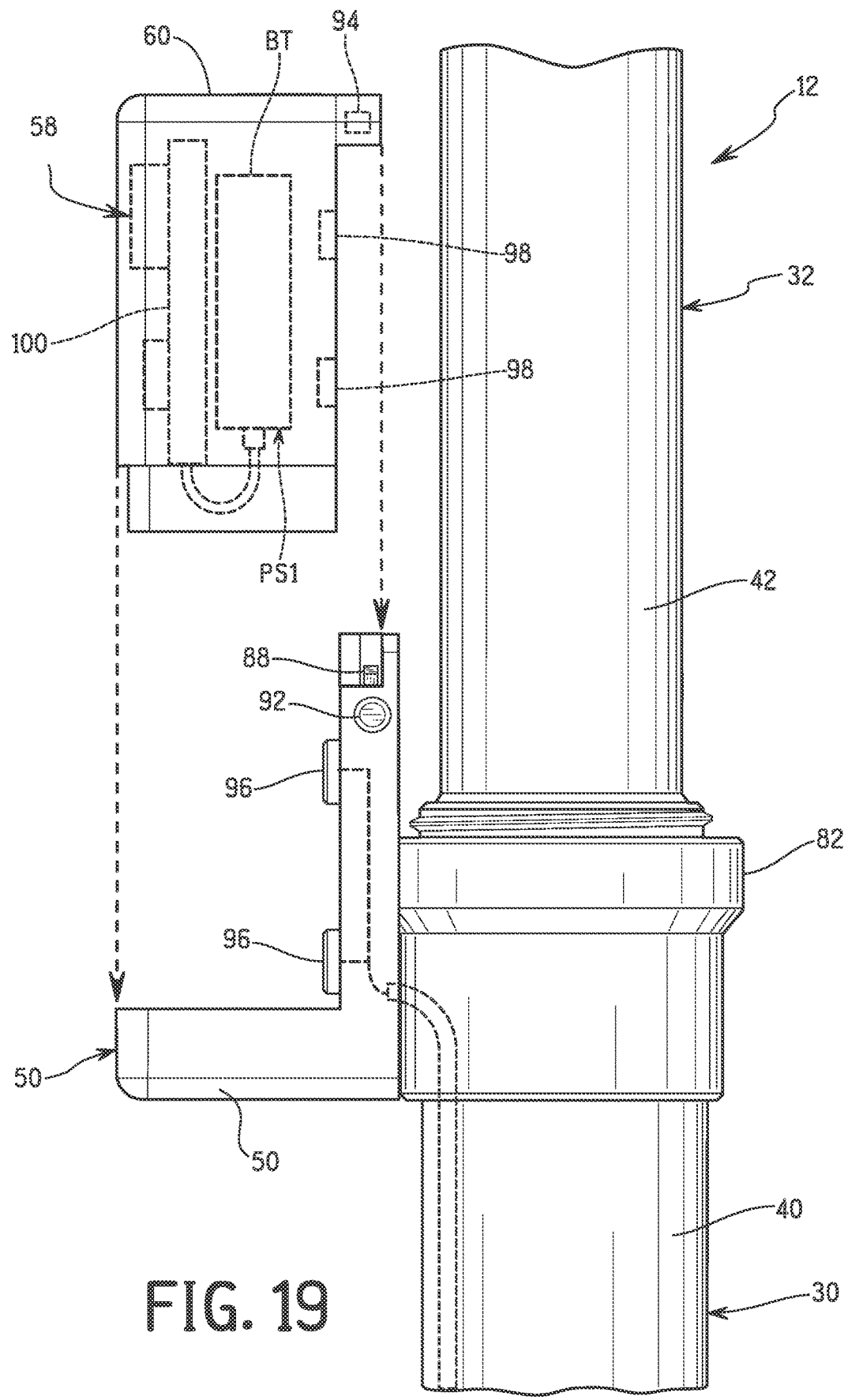
FIG. 19 is an enlarged side elevational view of a middle portion of the height adjustable seatpost illustrated in FIG. 18 in which the electric unit is detached.

As seen in FIG. 19, the base 81 of the first electrical connector 50 is provided with a pair of first electrical contacts 96. The first electrical contacts 96 of the first electrical connector 50 contact second electrical contacts 98 that are provided to the electric unit 56 where the electric unit 56 is in the mounted state to the first electrical connector 50. The second electrical contacts 98 are electrically connect to the first power supply PS1 and the wireless communicator 56.

As seen in FIG. 19, here, the electric unit 56 includes a substrate 100 on which the wireless communicator 56 is disposed. The substrate 100 can also include other circuits such as a recharging circuit as needed and/or desired. The substrate 100 is diagrammatically illustrated as a printed circuit board such that the first power supply PS1 is connected to the wireless communicator 56 via the substrate 100. Preferably, the battery BT of the first power supply PS1 has a plug-in type connector that plugs into a matting connector provided to the substrate 100. The second electrical contacts 98 are electrically connect to the first power supply PS1 and the wireless communicator 56 via the substrate 100.

While one example of the electric unit 56 is illustrated, it will be apparent from this disclosure that the shape and/or size of the electric unit 56 are not limited to the illustrated shape and size. Rather, the size and shape of the electric unit 56 can be changed according to the size of electronics used in the electric unit 56 as well as other design considerations.

Also, it will be apparent from this disclosure that the shape and/or size of the first electrical connector 50 are not limited to the illustrated shape and size. Rather, the size and shape of the first electrical connector 50 can be changed as needed and/or desired.

Figure 21:
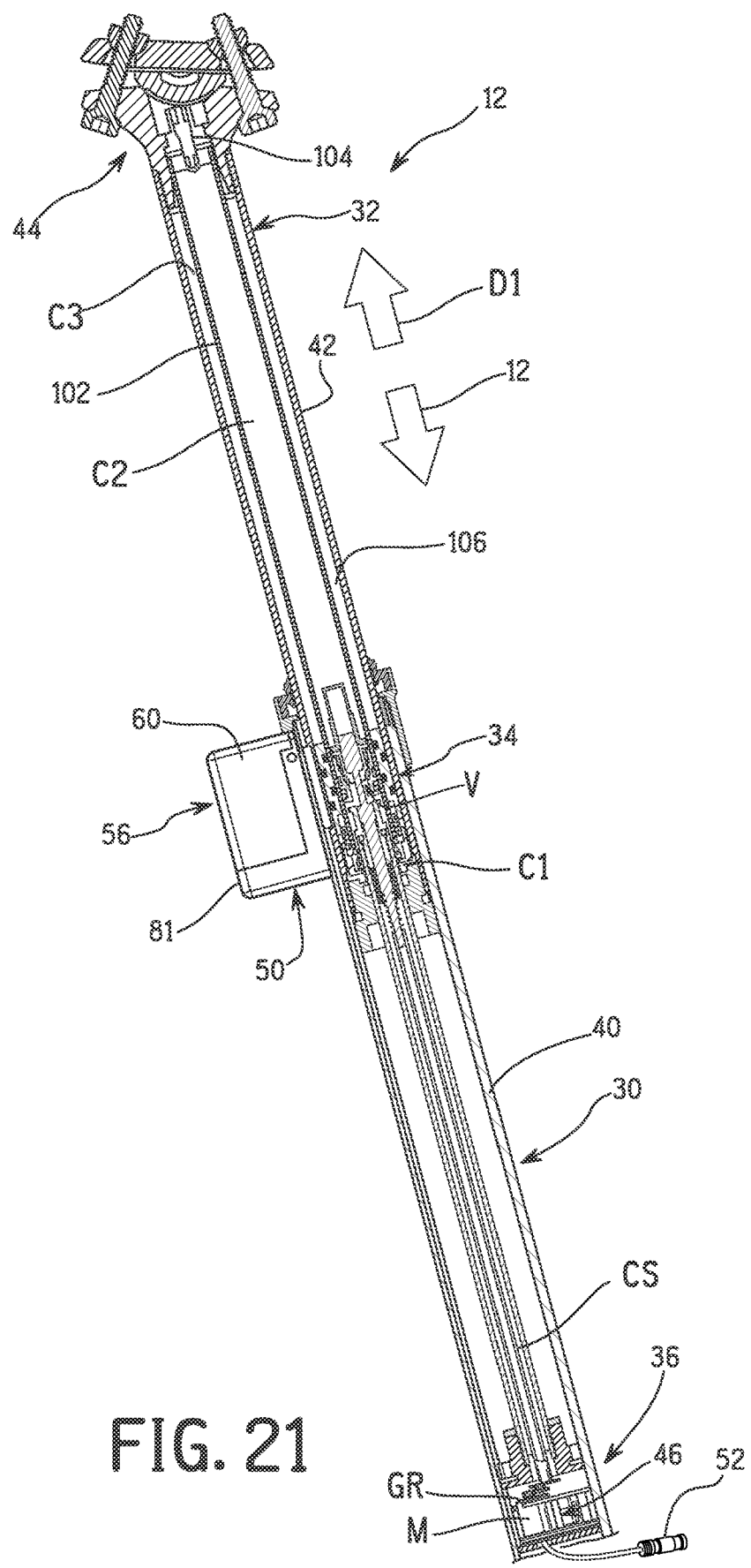
FIG. 21 is a longitudinal cross-sectional view of the height adjustable seatpost illustrated in FIG. 18.

As seen in FIG. 21, the seatpost 12 further provided with an inner tube 102 that is coaxially disposed inside the second tube 42, and a fluid filling valve 104 attached to the saddle mounting structure 44. The fluid filling valve 104 is fluidly connected to a third fluid chamber C3 that is defined between the second tube 42 and the inner tube 102. In this way, a compressible fluid (e.g., air or gas) can be added to the third fluid chamber C3 via the fluid filling valve 104.

Figure 22:
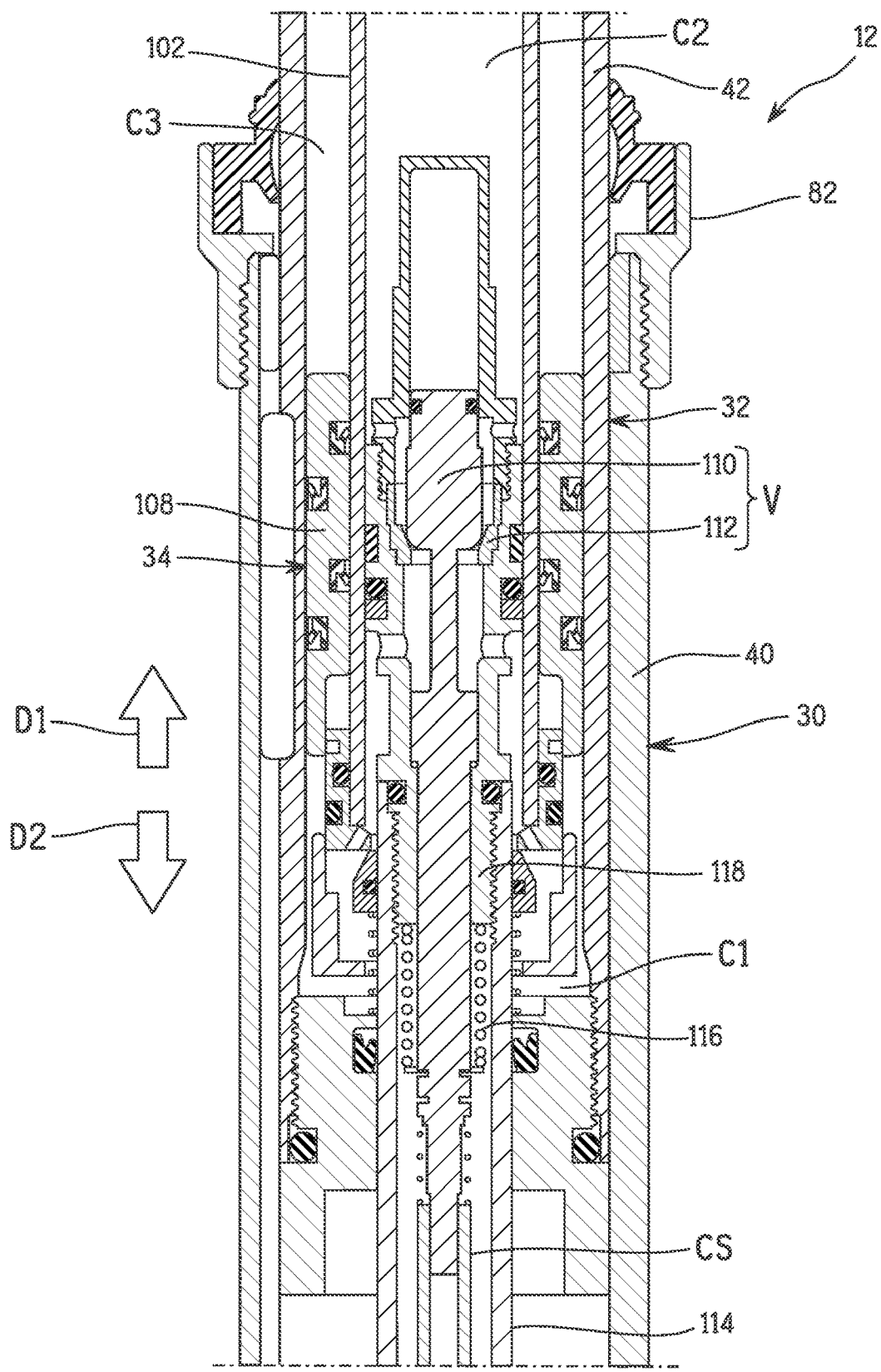
FIG. 22 is an enlarged longitudinal cross-sectional view of the middle portion of the height adjustable seatpost assembly illustrated in FIG. 21 with a flow control valve in a closed state.
Figure 23:
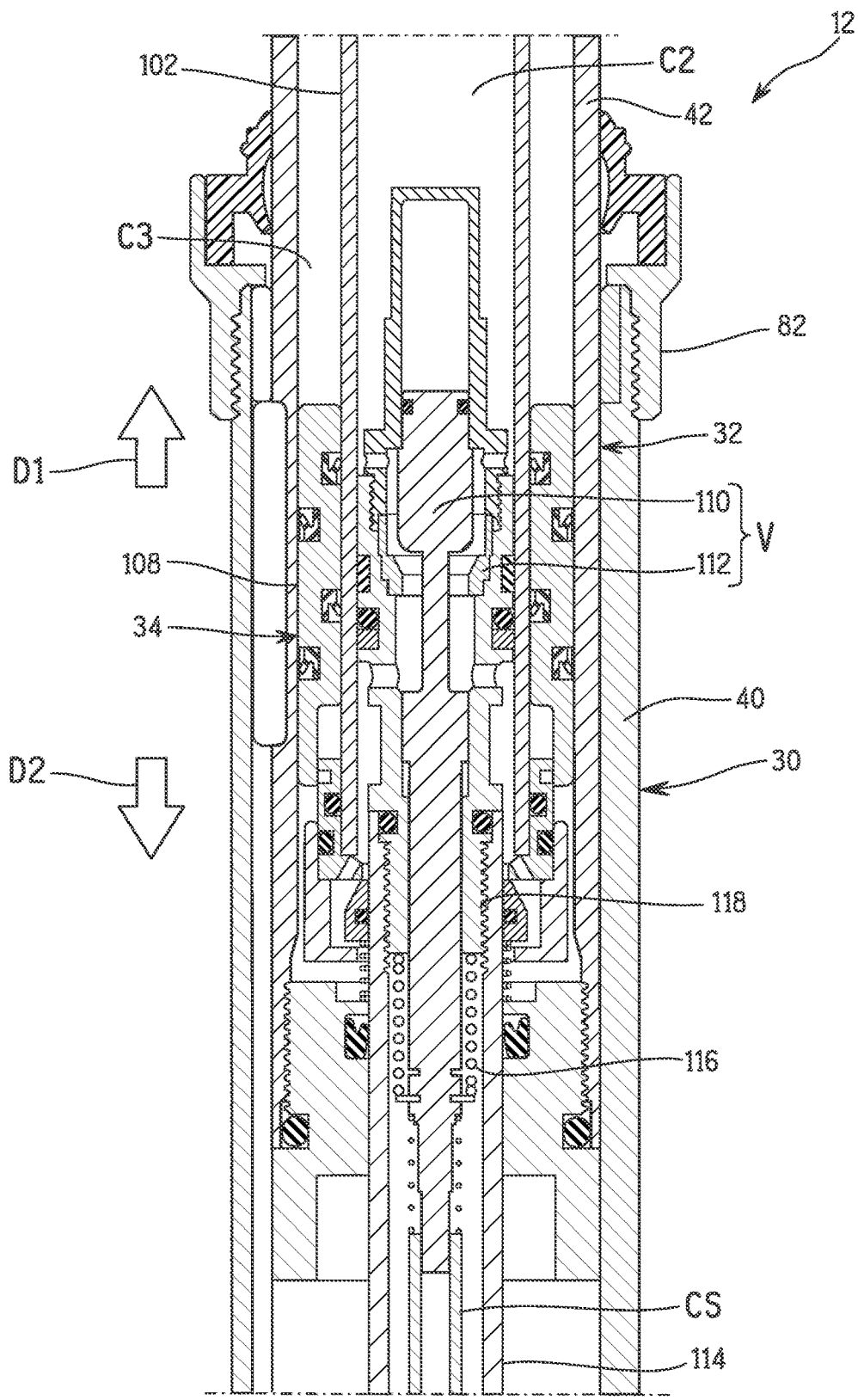
FIG. 23 is an enlarged longitudinal cross-sectional view of a middle portion of the height adjustable seatpost assembly illustrated in FIGS. 21 and 22 with the flow control valve in an open state.

Turning now to FIGS. 22 and 23, the positioning structure 34 of the seatpost 12 is illustrated in more detail. Here, the positioning structure 34 is the same positioning structure that is disclosed in U.S. Patent Application Publication No. 2020/0023918. Thus, the positioning structure 34 will only be briefly discussed herein. Moreover, the positioning structure of the seatpost 12 is not limited to the illustrated positioning structure.

Basically, the positioning structure 34 is configured to position the first tube 40 and the second tube 42 relative to each other. The positioning structure 34 is configured to be operated via the user operable input device 16 (see FIGS. 2 and 3). As shown in FIGS. 22 and 23, the positioning structure 34 includes the locked state (see FIG. 22) and the adjustable state (see FIG. 23). The positioning structure 34 changes a state of the seatpost 12 between the locked state and the adjustable state.

In the locked state, as shown in FIG. 22, the second tube 42 is fixed relative to the first tube 40 to prevent movement in the axial direction. Specifically, in the locked state, the overall length of the seatpost 12 is maintained at an adjusted overall length. In the locked state, the first tube 40 and the second tube 42 are fixedly positioned relative to each other in the movement directions D1 and D2. In the adjustable state, as shown in FIG. 23, a position of the second tube 42 is adjustable relative to the first tube 40 in the movement directions D1 and D2. Specifically, in the adjustable state, the overall length of the seatpost 12 is continuously adjustable within an adjustable range by operating the first operating device 48 (see FIG. 4). Namely, in the adjustable state, the positional relationship between the first tube 40 and the second tube 42 is continuously adjustable within the adjustable range. The adjustable state of the seatpost 12 is not limited to this embodiment. The total length of the seatpost 12 can be stepwise adjusted in the adjustable state. For example, the total length of the seatpost 12 can be stepwise adjusted at each of different lengths. Thus, the positioning structure 34 changes the state of the seatpost 12 between the locked state and the adjustable state. Specifically, the positioning structure 34 changes the state of the first tube 40 and the second tube 42 between the locked state and the adjustable state.

As shown in FIGS. 22 and 23, the positioning structure 34 includes the first fluid chamber C1 and the second fluid chamber C2 as mentioned above. The first fluid chamber C1 and the second fluid chamber C2 include an incompressible fluid. For example, the incompressible fluid can be a hydraulic oil or any other suitable liquid. The first fluid chamber C1 is arranged downward from the second fluid chamber C2 and on radially outside of the second fluid chamber C2. In this embodiment, the first fluid chamber C1 is filled with oil as the incompressible fluid.

The positioning structure 34 further includes a movable piston 108. The movable piston 108 is formed in a substantially cylindrical shape. The movable piston 108 is slidably supported between the second tube 42 and the inner tube 102. The movable piston 108 is disposed between the first fluid chamber C1 and the third fluid chamber C3 to change a volume ratio between the first fluid chamber C1 and the third fluid chamber C3. Specifically, the movable piston 108 is disposed in the space between the inner peripheral surface of the second tube 42 and the outer peripheral surface of the inner tube 102 in the radial direction. The movable piston 108 is configured to be movable between the second tube 42 and the inner tube 102 in the axial direction. In this way, the movable piston 108 is configured to be movable between the first fluid chamber C1 and the third fluid chamber C3 in the axial direction. The compressible fluid in the third fluid chamber C3 biases the movable piston 108 toward the first fluid chamber C1.

The valve V basically includes a valve body 110 and a valve seat 112. The valve V is partial disposed in a lower end of the inner tube 102, and is supported by the first tube 40 via a support rod 114 that is attached to the valve seat 112. The position of the valve body 110 is continuously adjustable relative to the valve seat 112 between the closed position and the open position. Here, the valve V also includes a biasing element 116 for biasing the valve body 110 towards the valve seat 112. Thus, the biasing element 116 is configured to bias the valve body 110 toward the closed position. When the first operating device 48 is not being operated, the valve body 110 is in the closed position by the biasing force of the biasing element 116. When the first operating device 48 is operated, the motor M of the electric actuator 36 transmits a drive force to the positioning structure 34. Thereby, the valve body 110 moves relative to a support rod 114 from the closed position to the open position against a biasing force of the biasing element 116. Here, the biasing element 116 is a coil compression spring that is disposed around the valve body 110.

Thus, the valve body 110 is movable relative to the support rod 114 and the first tube 40 in the axial direction. The support rod 114 is disposed at the lower end of the inner tube 102, and supports the motor M of the electric actuator 36. The support rod 114 is a hollow tube with the control shaft CS located therein. Thus, the second tube 42 and the inner tube 102 slide with respect to the valve V during adjustment of the length (i.e., the height in the seatpost 12).

Here, the valve V also includes a valve seat support 118 that is attached to the upper end of the support rod 114. The valve seat 112 is coupled to the valve seat support 118, while the valve body 110 is movably disposed inside the support rod 114. The valve body 110 is connected to the motor M of the electric actuator 36 by the control shaft CS. The control shaft CS receives the lower end of the valve body 110 such that axial movement of the control shaft CS is transmitted to the valve body 110. In this way, the valve body 110 is moved in the axial direction by the operation of the motor M of the electric actuator 36. In other words, the motor M of the electric actuator 36 is configured to move the valve body 110 to change the valve state from one of the closed state and the open state to the other of the closed state and the open state. In particular, the control shaft CS is attached to the valve body 110 for moving the valve body 110 relative to the valve seat 112 in the axial direction in response to movement of the motor M of the electric actuator 36 by operation of the first operating device 48. While the control shaft CS is illustrated as being hollow, it will be apparent from this disclosure that the control shaft CS does not need to be hollow, and can be modified as needed and/or desired.

In the closed state, the incompressible fluid is immovable between the first fluid chamber C1 and the second fluid chamber C2, and the movable piston 108 is also substantially stable. In the closed state, the saddle S is held at an adjusted height position where a bicycle user sets. In this case, the incompressible fluid does not move between the first fluid chamber C1 and the second fluid chamber C2, because the valve V is closed by the positioning structure 34.

In the open state, the incompressible fluid moves between the first fluid chamber C1 and the second fluid chamber C2 as the second tube 42 moves relative to the first tube 40 in the axial direction. Then, the movable piston 108 moves in the axial direction by the movement of the incompressible fluid. For example, the movable piston 108 moves downward as the incompressible fluid moves from the first fluid chamber C1 to the second fluid chamber C2. In this case, the third fluid chamber C3 expands, the first fluid chamber C1 shrinks, and the second fluid chamber C2 expands. Thereby, the saddle S moves upward. Also, for example, the movable piston 108 moves upward as the incompressible fluid moves from the second fluid chamber C2 to the first fluid chamber C1. In this case, the third fluid chamber C3 shrinks, the first fluid chamber C1 expands, and the second fluid chamber C2 shrinks. Thereby, the saddle S moves downward.

Figure 24:
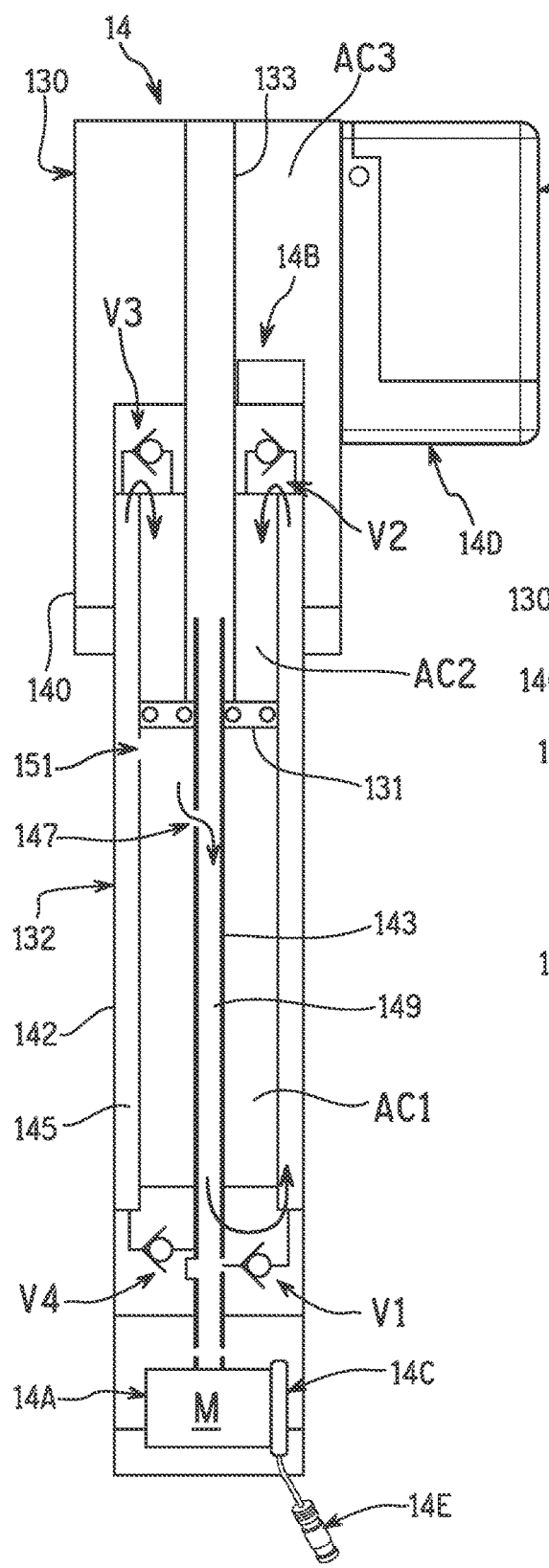
FIG. 24 is a schematic view of the rear suspension illustrated in FIG. 1 in a long-stroke position.
Figure 25:
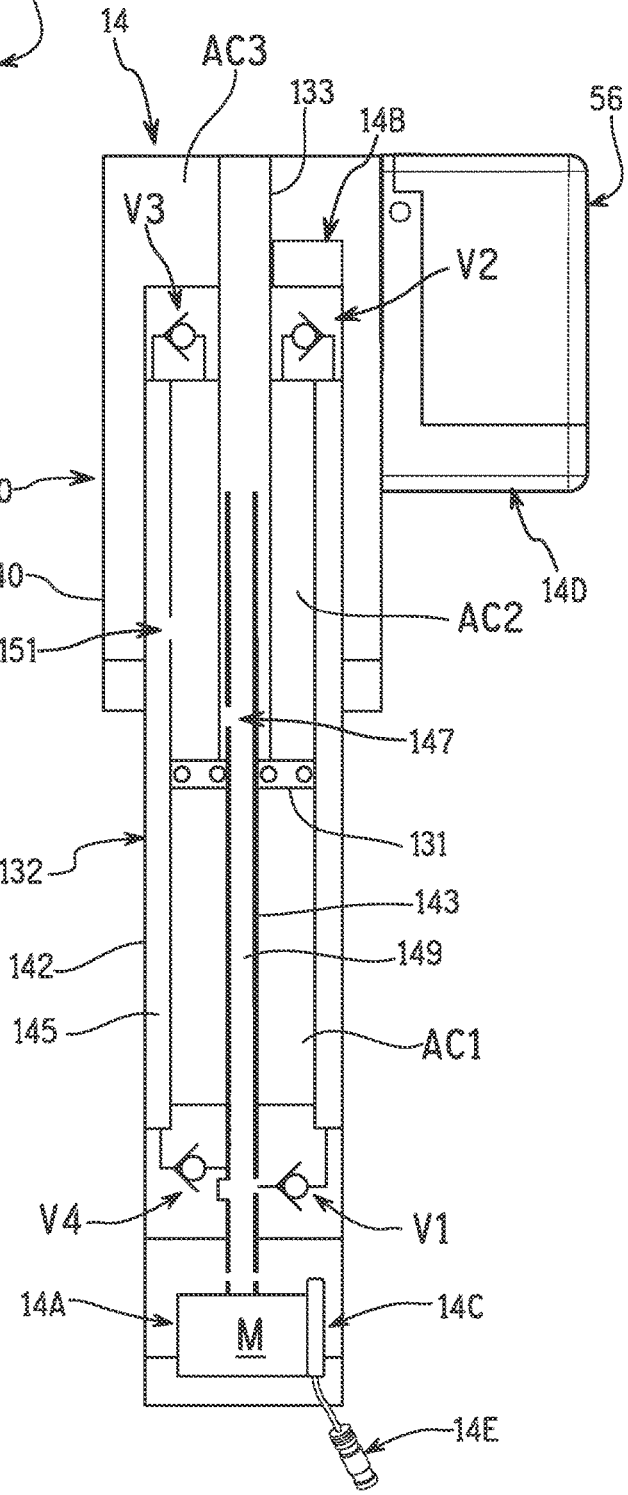
FIG. 25 is a schematic view of the rear suspension illustrated in FIGS. 1 and 24 in a short-stroke position.

Turning now to FIGS. 24 and 25, the rear suspension 14 will be discussed in more concrete detail. The rear suspension 14 is configured such that an overall stroke can be adjusted, which results in the overall length of the rear suspension 14 being changed accordance with the change is stroke. As mentioned above, the rear suspension 14 is configured to receive the electric unit 56. Of course, it will be apparent from this disclosure that the location, shape and/or size of the electric unit 56 are not limited to the illustrated configuration. Rather, similar to the seatpost 12, the rear suspension 14 can be configured such that the electric unit 56 can be located in a variety of other suitable locations on the rear suspension 14, or remotely located from the rear suspension 14 by a wire. Also, the size and shape of the electric unit 56 can be changed according to the size of electronics used in the electric unit 56 as well as other design considerations.

The rear suspension 14 (the rider-posture changing device) includes a first member 130, a second member 132, the electric actuator 14A and the positioning structure 14B. In the illustrated embodiment, the electric actuator 14A is located on at an end of the second member 132 that is remote from the first member 130. Of course, it will be apparent from this disclosure that the location, shape and/or size of the electric actuator 14A are not limited to the illustrated configuration. Rather, similar to the seatpost 12, the rear suspension 14 can be configured such that the electric actuator 14A can be located in a variety of other suitable locations on the rear suspension 14. Also, the size and shape of the electric actuator 14A can be changed according to the configuration of the rear suspension 14.

As mentioned above, the rear suspension 14 (the rider-posture changing device) further comprises the electric controller 14C that is configured to operate the electric actuator 14A in response to a control signal. Also, the rear suspension 14 further comprises the first electrical connector 14D and the second electrical connector 14E. The first electrical connector 14D is configured to be connected to the electric unit 56 in the same manner as discussed above with respect to the first electrical connector 50. The second electrical connector 14E is configured to be connected to the second power supply PS2 in the same manner as discussed above with respect to the second electrical connector 52.

Here, the rear suspension 14 is a telescopic apparatus. A piston 131 is attached to the first member 130 by a support 133. The first member 130 includes a first tube 140, and the second member 132 includes a second tube 142. The first tube 140 and the second tube 142 are telescopically arranged. The piston 131 divides the first tube 140 and the second tube 142 into a first air chamber AC1 and a second air chamber AC2. A third air chamber AC3 is formed in the area of the overlap between the first tube 140 and the second tube 142 The first air chamber AC1 and the second air chamber AC2 are adjusted by the electric actuator 14A and the positioning structure 14B to change the stoke of the rear suspension 14, which also changes an overall length of the rear suspension 14.

Here, the rear suspension 14 includes an axially movable member 143 that is moved by the electric actuator 14A for adjusting the volumes between the first air chamber AC1 and the second air chamber AC2 to change the stroke of the rear suspension 14. Thus, the axially movable member 143 is configured to initiate a stroke adjustment of the rear suspension 14. The electric actuator 14A is configured to operate the axially movable member 143 for controlling flow through a first check valve V1, a second check valve V2, a third check valve V3 and a fourth check valve V4. The electric actuator 14A provided in the second tube 142. The axially movable member 143 is movable between a long-stroke position (FIGS. 24 and 27) and a short-stroke position (FIGS. 25 and 26) relative to the second tube 142. The electric actuator 14A comprises a motor M and can further comprise a transmitting structure.

As seen in FIG. 24, the second tube 142 is located at a long-stroke position relative to the first tube 140. When the rider selects the short-stroke state using the third operating device 74, the axially movable member 143 is moved by the electric actuator 14A so that the second tube 142 can move from the long-stroke position (FIG. 24) to the short-stroke position (FIG. 25). Thus, the first check valve V1 becomes in fluid communication with an inside passage 149 of the axially movable member 143 and the fourth check valve V4 is no longer in communication with the fluid inside passage 149 of the axially movable member 143. As a result, the first air chamber AC1 is in fluid communication with a first communication passage 145 via a second communication passage 147, an inside passage 149 of the axially movable member 143 and the first check valve V1. The first communication passage 145 is in fluid communication with the second air chamber AC2 via the second check valve V2 and the third check valve V3. When the rider downward presses the second tube 142, air flows from the first air chamber AC1 to the second air chamber AC2 via the inside passage 149 and the first communication passage 145, causing the second tube 142 first tube 140 to move relative to the second tube 142 in the axial direction.

As seen in FIG. 25, when the second communication passage 147 passes through the piston 131, air is prevented from flowing from the first air chamber AC1 to the second air chamber AC2 via the inside passage 149 and the first communication passage 145. This causes the first tube 140 to stop at a short-stroke position relative to the second tube 142. Accordingly, an initial total length of the rear suspension 14 can be decreased. Therefore, the electric actuator 14A is configured to telescopically position the first tube 140 relative to the second tube 142.

Figure 26:
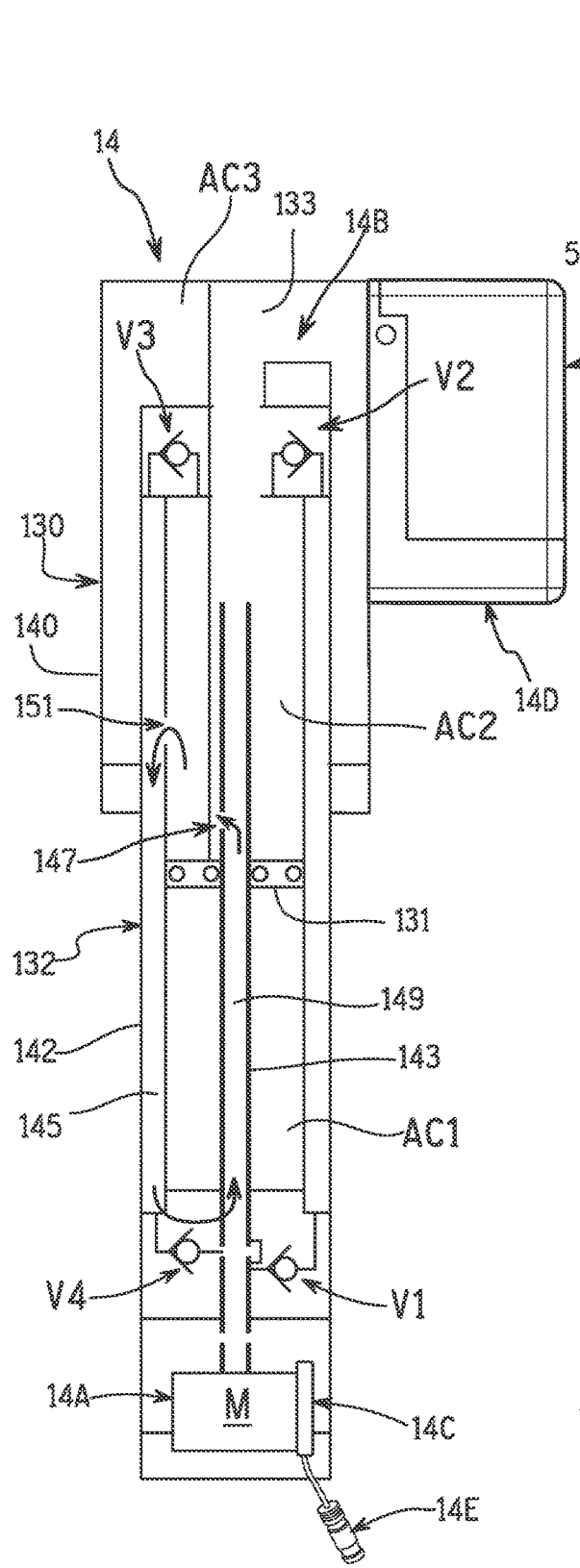
FIG. 26 is a schematic view of the rear suspension illustrated in FIG. 1 in a short-stroke position.
Figure 27:
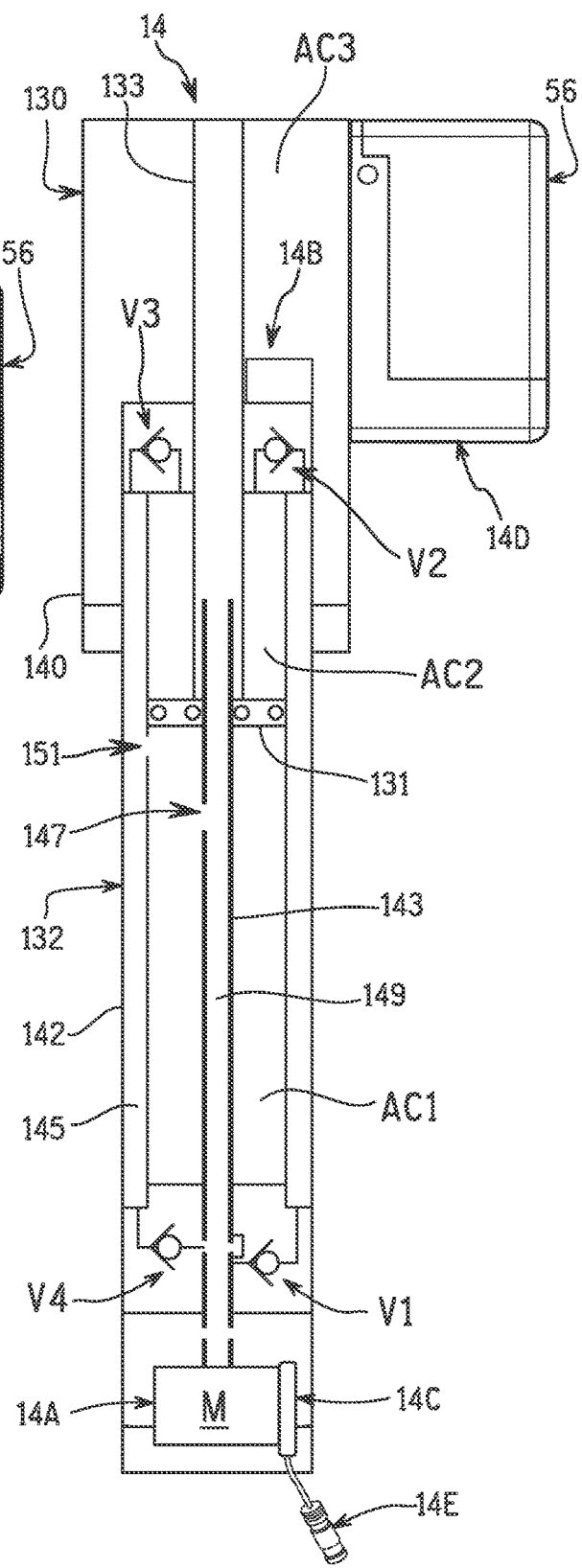
FIG. 27 is a schematic view of the rear suspension illustrated in FIGS. 1 and 24 in a long-stroke position.

As seen in FIG. 26, the second tube 142 is located at a short-stroke position relative to the first tube 140. When the rider selects the long-stroke state, the axially movable member 143 is moved by the electric actuator 14A so that the second tube 142 can move from the short-stroke position (FIG. 26) to the long-stroke position (FIG. 27). Thus, the fourth check valve V4 becomes in fluid communication with an inside passage 149 of the axially movable member 143 and the first check valve V1 is no longer in communication with the fluid inside passage 149 of the axially movable member 143. As a result, the second air chamber AC2 is in fluid communication with the inside passage 149 via a third communication passage 151, the first communication passage 145 and the second check valve V2. In the short-stroke state, a pressure of the second air chamber AC2 is higher than a pressure of the second air chamber AC2 in the long-stroke state. Accordingly, air naturally flows from the second air chamber AC2 to the first air chamber AC1 via the first communication passage 145 and the inside passage 149, causing the first tube 140 to move relative to the second tube 142.

As seen in FIG. 27, when the third communication passage 151 passes through the piston 131, air is prevented from flowing from the second air chamber AC2 to the first air chamber AC1 via the first communication passage 145 and the inside passage 149. This causes the first tube 140 to stop at the long-stroke position relative to the second tube 142. Accordingly, an initial total length of the rear suspension 14 can be increased. Therefore, the electric actuator 14A is configured to telescopically position the first tube 140 relative to the second tube 142.

The front suspension 16 includes a similar positioning structure as the positioning structure 14B of the rear suspension 14 for changing the stroke. Thus, the positioning structure 16B of the front suspension 16 for changing stroke will not be discussed and/or illustrated in further detail.

Figure 28:
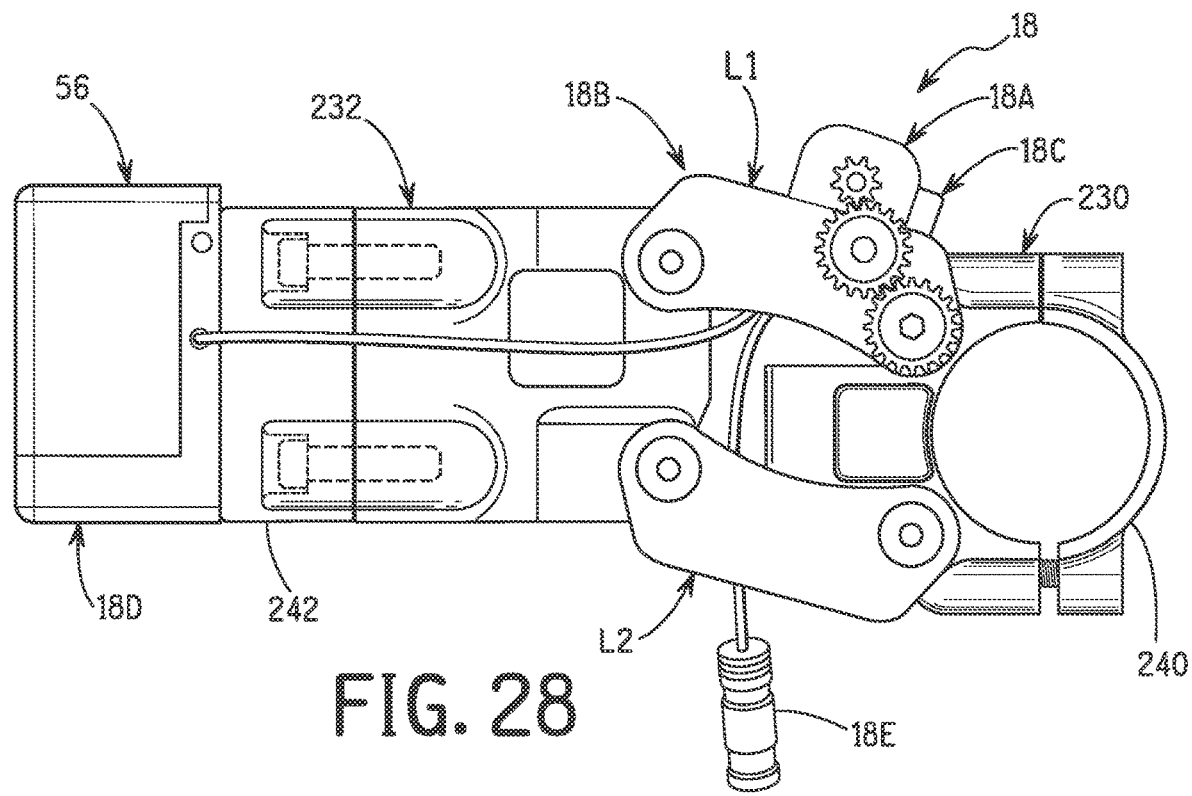
FIG. 28 is an enlarged side elevational view of the adjustable handlebar stem illustrated in FIG. 1 in a low position.
Figure 29:
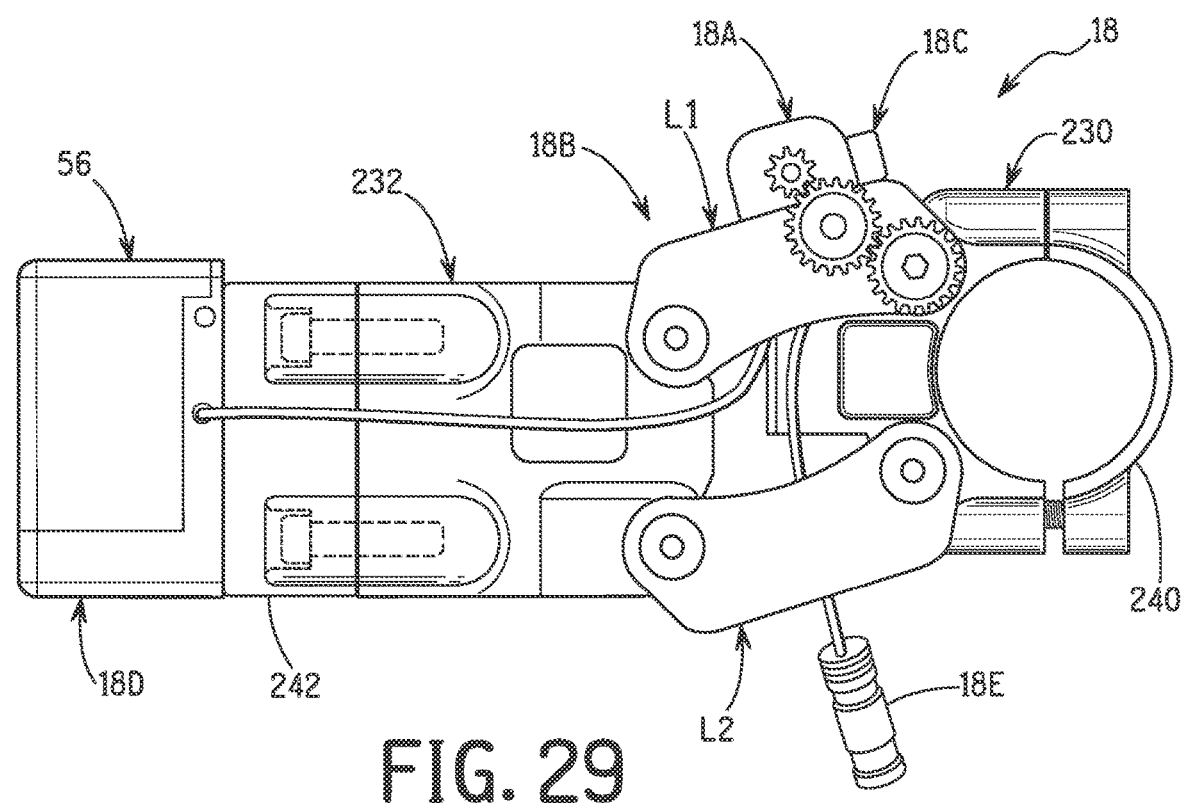
FIG. 29 is an enlarged side elevational view of the adjustable handlebar stem illustrated in FIGS. 1 and 28 in a high position.

Turning now to FIGS. 28 and 29, the stem 18 will be discussed in more concrete detail. The stem 18 is configured such that a height of the handlebar H can be adjusted. As mentioned above, the stem 18 is configured to receive the electric unit 56. Of course, it will be apparent from this disclosure that the location, shape and/or size of the electric unit 56 are not limited to the illustrated configuration. Rather, similar to the seatpost 12, the stem 18 can be configured such that the electric unit 56 can be located in a variety of other suitable locations on the stem 18, or remotely located from the stem 18 by a wire. Also, the size and shape of the electric unit 56 can be changed according to the size of electronics used in the electric unit 56 as well as other design considerations.

The stem 18 (the rider-posture changing device) includes a first member 230, a second member 232, the electric actuator 18A and the positioning structure 18B. In the illustrated embodiment, the electric actuator 18A is located on the positioning structure 18B. Of course, it will be apparent from this disclosure that the location, shape and/or size of the electric actuator 18A are not limited to the illustrated configuration. Rather, similar to the seatpost 12, the stem 18 can be configured such that the electric actuator 18A can be located in a variety of other suitable locations on the stem 18. Also, the size and shape of the electric actuator 18A can be changed according to the configuration of the stem 18.

As mentioned above, the stem 18 (the rider-posture changing device) further comprises the electric controller 18C that is configured to operate the electric actuator 148 in response to a control signal. Also, the stem 18 further comprises the first electrical connector 18D and the second electrical connector 18E. The first electrical connector 18D is configured to be connected to the electric unit 56 in the same manner as discussed above with respect to the first electrical connector 50. The second electrical connector 18E is configured to be connected to the second power supply PS2 in the same manner as discussed above with respect to the second electrical connector 52.

Here, the first member 230 includes a clamp 240 for securing the handlebar H to the stem 18. The second member 232 includes a clamp 242 for securing the stem 18 to a steerer tube of the front suspension 16. In the case of the stem 18, the positioning structure 18B comprises a first link L1 and a second link L2. The first link L1 and the second link L2 have first ends pivotally coupled to the first member 230, and second ends pivotally coupled to the second member 232. Thus, the first link L1 and the second link L2 form a four-bar linkage with the first member 230 and the second member 232.

The electric actuator 18A includes a motor and a gear reduction unit for moving the first member 230 relative to the second member 232 via the first link L1 and the second link L2. Here, the electric actuator 18A and the electric controller 18C are provided to the first link L1. The electric controller 18C is electrically connected to the first electrical connector 18D and the second electrical connector 18E.

The rear derailleur 20 includes a similar positioning structure as the positioning structure 18B of the stem 18 for changing gear positions. Thus, the positioning structure 20B of the rear derailleur 20 for changing gears positions will not be discussed and/or illustrated in further detail.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a human-powered vehicle field (e.g., bicycle) in an upright, riding position and equipped with the rider-posture changing device. Accordingly, these directional terms, as utilized to describe the rider-posture changing device should be interpreted relative to a human-powered vehicle field (e.g., bicycle) in an upright riding position on a horizontal surface and that is equipped with the rider-posture changing device. The terms "left" and "right" are used to indicate the "right" when referencing from the right side as viewed from the rear of the human-powered vehicle field (e.g., bicycle), and the "left" when referencing from the left side as viewed from the rear of the human-powered vehicle field (e.g., bicycle).

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A rider-posture changing device for a human-powered vehicle, the rider-posture changing device comprising:
    a first member;
    a second member configured to be movable relative to the first member;
    a positioning structure configured to adjustably position the first member relative to the second member; and
    an electric actuator configured to actuate the positioning structure, the electric actuator includes a first electrical connector configured to be detachably and reattachably connected to a first power supply, and a second electrical connector configured to be detachably and reattachably connected to a second power supply.

2. The rider-posture changing device according to claim 1, wherein
    the first power supply is configured to be detachably connected to another connector that is provided to another component of the human-powered vehicle.

3. The rider-posture changing device according to claim 1, wherein
    one of the first member and the second member is configured to mount the first power supply.

4. The rider-posture changing device according to claim 1, wherein
    the second power supply is provided to another component of the human-powered vehicle.

5. The rider-posture changing device according to claim 1, further comprising
    an electric controller configured to operate the electric actuator in response to a control signal.

6. The rider-posture changing device according to claim 5, wherein
    the electric controller configured to selectively establish a wireless communication in a first state where the electric actuator is connected to the first power supply and a wired communication in a second state where the electric actuator is unconnected to the first power supply.

7. A control system for the human-powered vehicle, the control system comprising:
    the rider-posture changing device according to claim 1,
    the rider posture changing device including a communication unit and an electric controller; and further comprising
    another component of the human-powered vehicle, the another component including another communication unit,
    the electric controller being configured to communicate with the another component via the another communication unit in accordance with a communication state of the communication unit of the rider-posture changing device.

8. The control system according to claim 7, wherein
    the electric controller is connected to at least one of a reciprocal device and a circuitry to distinguish data and power.

9. The control system according to claim 7, wherein
    one of the first member and the second member is configured to be provided to a frame of the human-powered vehicle.

10. The control system according to claim 9, wherein
    the first member includes a first tube, and the second member includes a second tube, the first tube and the second tube are telescopically arranged.

11. The control system according to claim 7, wherein
    the rider-posture changing device includes at least one of a height adjustable seatpost, a suspension, and an adjustable handlebar stem.

12. A rider-posture changing device for a human-powered vehicle, the rider-posture changing device comprising:
    a first member;
    a second member configured to be movable relative to the first member;
    a positioning structure configured to adjustably position the first member relative to the second member;
    an electric actuator configured to actuate the positioning structure; and
    an electric unit including a first power supply and a wireless communicator, the electric unit being detachably and reattachably connected to the electric actuator,
    the electric actuator being configured to be detachably and reattachably connected to a second power supply.

13. A rider-posture changing device for a human-powered vehicle, the rider-posture changing device comprising:
a first member;
a second member configured to be movable relative to the first member;
a positioning structure configured to adjustably position the first member relative to the second member;
an electric actuator configured to actuate the positioning structure; and
an electric unit including a first power supply and a wireless communicator, the first power supply and the wireless communicator of the electric unit being detachably and reattachably connected to the electric actuator.

14. The rider-posture changing device according to claim 13, wherein
the electric unit is provided to one of the first member and the second member.

15. The rider-posture changing device according to claim 13, wherein
the first power supply includes at least one battery.

16. The rider-posture changing device according to claim 15, wherein
the at least one battery includes at least one rechargeable battery.

17. The rider-posture changing device according to claim 13, wherein
the electric unit includes a housing that accommodates the wireless communicator and the first power supply, and
the housing is configured such that the wireless communicator and the first power supply are detachably and reattachably connected to the electric actuator as a single unit.

18. The rider-posture changing device according to claim 13, wherein
the electric unit includes a substrate on which the wireless communicator is disposed.

19. The rider-posture changing device according to claim 18, wherein
the substrate is disposed adjacent to the power supply.

* * * * *